(12) United States Patent
Kilgard et al.

(10) Patent No.: US 6,894,687 B1
(45) Date of Patent: May 17, 2005

(54) SYSTEM, METHOD AND COMPUTER PROGRAM PRODUCT FOR VERTEX ATTRIBUTE ALIASING IN A GRAPHICS PIPELINE

(75) Inventors: Mark J. Kilgard, Austin, TX (US); John Erik Lindholm, Cupertino, CA (US); Robert Steven Glanville, Cupertino, CA (US); Michael I. Gold, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 90 days.

(21) Appl. No.: 09/877,852

(22) Filed: Jun. 8, 2001

(51) Int. Cl.$^7$ .............................................. G06T 15/00
(52) U.S. Cl. ....................................................... 345/419
(58) Field of Search ................................ 345/419, 426, 345/506, 606, 619, 611, 594; 382/303

(56) References Cited

U.S. PATENT DOCUMENTS

| | | | | |
|---|---|---|---|---|
| 5,369,737 A | * | 11/1994 | Gholizadeh et al. | 345/426 |
| 5,651,106 A | * | 7/1997 | Ashburn | 345/441 |
| 5,798,770 A | * | 8/1998 | Baldwin | 345/506 |
| 6,198,488 B1 | * | 3/2001 | Lindholm et al. | 345/426 |
| 2003/0103054 A1 | * | 6/2003 | Montrym et al. | 345/506 |

* cited by examiner

Primary Examiner—Jeffery Brier
Assistant Examiner—J. Amini
(74) Attorney, Agent, or Firm—Cooley Godward LLP

(57) ABSTRACT

A system, method and article of manufacture are provided for aliasing vertex attributes during vertex processing. Initially, a plurality of identifiers are each mapped to one of a plurality of parameters associated with vertex data. Thereafter, the vertex data is processed by calling the parameters utilizing a vertex program capable of referencing the parameters using the identifiers.

7 Claims, 5 Drawing Sheets

| Vertex Attribute Register Number | Conventional Per-vertex Parameter | Conventional Per-vertex Parameter Command | Conventional Component Mapping |
|---|---|---|---|
| 0 | vertex position | Vertex | x,y,z,w |
| 1 | vertex weights | VertexWeightEXT | w,0,0,1 |
| 2 | normal | Normal | x,y,z,1 |
| 3 | primary color | Color | r,g,b,a |
| 4 | secondary color | SecondaryColorEXT | r,g,b,1 |
| 5 | fog coordinate | FogCoordEXT | fc,0,0,1 |
| 6 | - | - | - |
| 7 | - | - | - |
| 8 | texture coord 0 | MultiTexCoord(GL_TEXTURE0_ARB, ...) | s,t,r,q |
| 9 | texture coord 1 | MultiTexCoord(GL_TEXTURE1_ARB, ...) | s,t,r,q |
| 10 | texture coord 2 | MultiTexCoord(GL_TEXTURE2_ARB, ...) | s,t,r,q |
| 11 | texture coord 3 | MultiTexCoord(GL_TEXTURE3_ARB, ...) | s,t,r,q |
| 12 | texture coord 4 | MultiTexCoord(GL_TEXTURE4_ARB, ...) | s,t,r,q |
| 13 | texture coord 5 | MultiTexCoord(GL_TEXTURE5_ARB, ...) | s,t,r,q |
| 14 | texture coord 6 | MultiTexCoord(GL_TEXTURE6_ARB, ...) | s,t,r,q |
| 15 | texture coord 7 | MultiTexCoord(GL_TEXTURE7_ARB, ...) | s,t,r,q |

FIG. 5

SYSTEM, METHOD AND COMPUTER PROGRAM PRODUCT FOR VERTEX ATTRIBUTE ALIASING IN A GRAPHICS PIPELINE

FIELD OF THE INVENTION

The present invention relates to computer graphics, and more particularly to vertex processing in a graphics pipeline.

BACKGROUND OF THE INVENTION

Conventional vertex processing for three-dimensional (3-D) graphics programming application program interfaces (APIs) such as Open Graphics Library (OpenGL®) and D3D™ provide support for per-vertex lighting, position transformation, and texture coordinate generation. The computations provided by such conventional vertex processing are routinely implemented by 3-D graphics hardware that greatly accelerates these operations.

One drawback of the aforementioned conventional vertex processing is that it is configurable, but not programmable. When using conventional vertex processing, an application can enable and disable various options, set transformation matrices, lighting, and texture coordinate generation parameters. However, such applications are limited to the set of computations provided by the conventional vertex processing feature set.

While the feature set has been gradually extended over time to support multiple texture units, and more texture coordinate generation modes and vertex blending schemes, the conventional vertex processing model is still fundamentally configurable, not programmable.

Conventional vertex processing assigns names to per-vertex quantities such as "position", "color", and "surface normal". These names convey a sense of how the quantities are processed by conventional vertex processing. For example, surface normals are used for lighting vertices. The quantities' meaning is directly tied to the operations performed with the quantity by conventional vertex processing. Similarly, other quantities such as "light position", "light color", and "modelview matrix" are named to convey how these quantities are used by conventional vertex processing.

Existing applications use API commands named based on the conventions of conventional vertex processing. For example, a vertex may be set in the manner shown in Table 1.

TABLE 1 glNormal3f(xnor, ynor, znor);
glColor3f(red, green, blue);
glVertex3f(xpos, ypos, zpos);

In contrast with conventional vertex processing, application-programmable vertex processing has no pre-existing meaning for the quantities used to process vertices. Instead, there is simply a predetermined amount of numbered per-vertex quantities (per-vertex variables) and a predetermined amount of state numbered quantities (per-vertex constants). How these quantities are used to process the vertices depends on the application-supplied vertex program's instruction sequence.

For example, a vertex would be set in the manner set forth in Table 1A.

TABLE 1A glVertexAttrib3fNV(2, xnor, ynor, znor);
glVertexAttrib3fNV(3, red, green, blue);
glVertexAttrib3fNV(0, xpos, ypos, zpos);

Prior art techniques for extending conventional vertex processing generally require adding more modes, state, and per-vertex attributes. This lead to per-vertex attributes beyond the standard OpenGL per-vertex attributes (position, normal, color, texture coordinates, etc). Examples of the new (extended) attributes are secondary color, fog coordinate, weights (for vertex blending), and additional texture coordinate sets.

While application-programmable vertex processing provides tremendous flexibility in comparison to conventional vertex processing, 3D applications must, however, assign their own meaning to vertex processing quantities rather than have meanings assigned by the conventions of conventional vertex processing. Because vertex programs assign the "meaning" to vertex attributes based on how the program uses the various vertex attributes, it makes little sense to give the vertex attributes conventional names. Application-programmable vertex processing considers vertex attributes "generic" numbered quantities.

This distinction between convention-specified and program-specified semantics for vertex processing quantities presents a significant hurdle to integrating application-programmable vertex processing into existing applications.

There is thus a need for a set of API features that facilitate combining application-programmable vertex processing with existing 3D applications originally authored to use conventional vertex processing.

There is a further need for API features that reduce the effort required to augment an existing 3D application to use application-programmable vertex processing.

DISCLOSURE OF THE INVENTION

A system, method and article of manufacture are provided for aliasing vertex attributes during vertex processing. Initially, a plurality of identifiers are each mapped to one of a plurality of parameters associated with vertex data. Thereafter, the vertex data is processed by calling the parameters utilizing a vertex program capable of referencing the parameters using the identifiers.

In one embodiment of the present invention, the parameters may include per-vertex parameters. For example, the parameters may include vertices, normals, colors, fog coordinates, vertex weights, and/or texture coordinates.

In another embodiment of the present invention, the parameters may also be capable of being called by a conventional semantic name associated with the parameters. As such, a need for defining additional semantic names for the parameters is avoided as a result of the aliasing.

A data structure may be provided for aliasing vertex attributes during vertex processing. Such data structure may include a table that maps each of a plurality of identifiers to one of a plurality of parameters associated with vertex data. As such, the vertex data may be processed by calling the parameters utilizing a vertex program capable of referencing the parameters using the table.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

FIG. 5 illustrates a data structure provided for aliasing vertex attributes during vertex processing.

DESCRIPTION OF THE PREFERRED EMBODIMENTS

Figure 1:
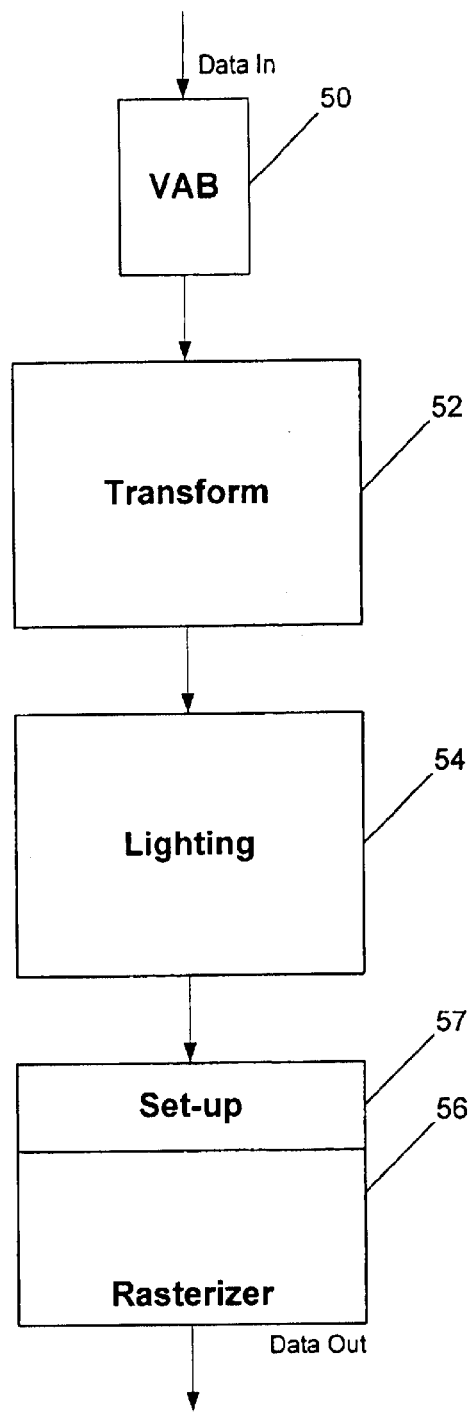
FIG. 1 is a diagram illustrating the various components of one embodiment of the present invention.

FIG. 1 is a diagram illustrating the various components of one embodiment of the present invention. As shown, the present embodiment includes a plurality of modules having a vertex attribute buffer (VAB) 50, a transform module 52, a lighting module 54, and a rasterization module 56 with a set-up module 57.

As an option, each of the foregoing modules may situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the present invention may also be implemented on multiple semiconductor platforms and/or utilizing a conventional CPU and bus implementation.

During operation, the VAB 50 is included for gathering and maintaining a plurality of vertex attribute states such as position, normal, colors, texture coordinates, etc. Completed vertices are processed by the transform module 52 and then sent to the lighting module 54. The transform module 52 generates vectors for the lighting module 54 to light. The output of the lighting module 54 is screen space data suitable for the set-up module which, in turn, sets up primitives. Thereafter, rasterization module 56 carries out rasterization of the primitives.

An interface may be used in conjunction with the various components set forth in FIG. 1. In one embodiment, such interface may include Open Graphics Library (OpenGL®) and/or D3D™ application program interfaces (APIs). OpenGL® is the computer industry's standard application program interface (API) for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects. OpenGL® and D3D™ APIs are commonly known to those of ordinary skill, and more information on the same may be found by reference to the OpenGL® Specification Version 1.2.1, which is incorporated herein by reference in its entirety.

As is well known, OpenGL® mandates a certain set of configurable per-vertex computations defining vertex transformation, texture coordinate generation and transformation, and lighting. Several extensions have been developed to provide further per-vertex computations to OpenGL®.

For example, extensions have defined new texture coordinate generation modes (ARB_texture_cube_map, NV_texgen_reflection, NV_texgen_emboss), new vertex transformation modes (EXT_vertex_weighting), new lighting modes (separate specular and rescale normal functionality), several modes for fog distance generation (NV_fog_distance), and eye-distance point size attenuation (EX_point_parameters).

Each of such extensions adds a small set of relatively inflexible per-vertex computations. As mentioned earlier, this inflexibility is in contrast to the typical flexibility provided by the underlying programmable floating point engines (whether micro-coded vertex engines, digital signal processors (DSPs), or central processor units (CPUs)) that are traditionally used to implement OpenGL's per-vertex computations.

The per-vertex computations for standard OpenGL® give a particular set of lighting and texture coordinate generation modes (along with any state for extensions defining per-vertex computations) is, in essence, a vertex program. In the present description, a vertex program includes a sequence of floating-point 4-component vector operations that determines how a set of program parameters (defined outside of the begin/end pair of OpenGL®) and an input set of per-vertex parameters are transformed to a set of per-vertex output parameters. However, such sequence of operations is defined implicitly by the current OpenGL® state settings rather than defined explicitly as a sequence of instructions.

In one embodiment, the present invention may supplement, or provide an extension, for OpenGL® and/or D3D™ APIs, and/or any other desired interface. Still yet, in another embodiment, the present invention may operate as a sole unitary interface.

The interface of the present invention exposes the OpenGL® application writer to a significant degree of per-vertex programmability for computing vertex parameters. In particular, the present extension provides an explicit mechanism for defining vertex program instruction sequences for application-defined vertex programs. In order to define such vertex programs, the present extension defines a vertex programming model including a floating-point 4-component vector instruction set and a relatively large set of floating-point 4-component registers.

The vertex programming model of the present extension is designed for efficient hardware implementation and to support a wide variety of vertex programs. By design, the entire set of existing vertex programs defined by existing OpenGL® per-vertex computation extensions can be implemented using the vertex programming model of the present extension.

Various features (i.e. matrix tracking, vertex attribute aliasing) associated with the operation of the present extension will now be set forth. Prior to such description, a glossary of terms used throughout the present description will be set forth.

Glossary vertex program mode—When vertex program mode is enabled, vertices are transformed by an application-defined vertex program.

conventional GL vertex transform mode—When vertex program mode is disabled (or the extension is not supported), vertices are transformed by GL's conventional texgen, lighting, and transform state.

provoke—denotes the beginning of vertex transformation by either vertex program mode or conventional GL vertex transform mode. Vertices are provoked when either glVertex or glVertexAttribNV(0, . . . ) is called.

program target—includes a type or class of program. The present extension supports two program targets: the vertex program and the vertex state program. Future extensions could add other program targets.

vertex program—includes an application-defined vertex program used to transform vertices when vertex program mode is enabled.

vertex state program—includes a program similar to a vertex program. Unlike a vertex program, a vertex state program runs outside of a glBegin/glEnd pair. Vertex state programs do not transform a vertex and, instead, update program parameters.

vertex attribute—includes one of 16 4-component per-vertex parameters defined by the present extension. These attributes alias with the conventional per-vertex parameters.

per-vertex parameter—includes a vertex attribute or a conventional per-vertex parameter such as set by glNormal3f or glColor3f.

program parameter—includes one of 96 4-component registers available to vertex programs. The state of these registers is shared among all vertex programs.

Tracking Matrices

Figure 2:
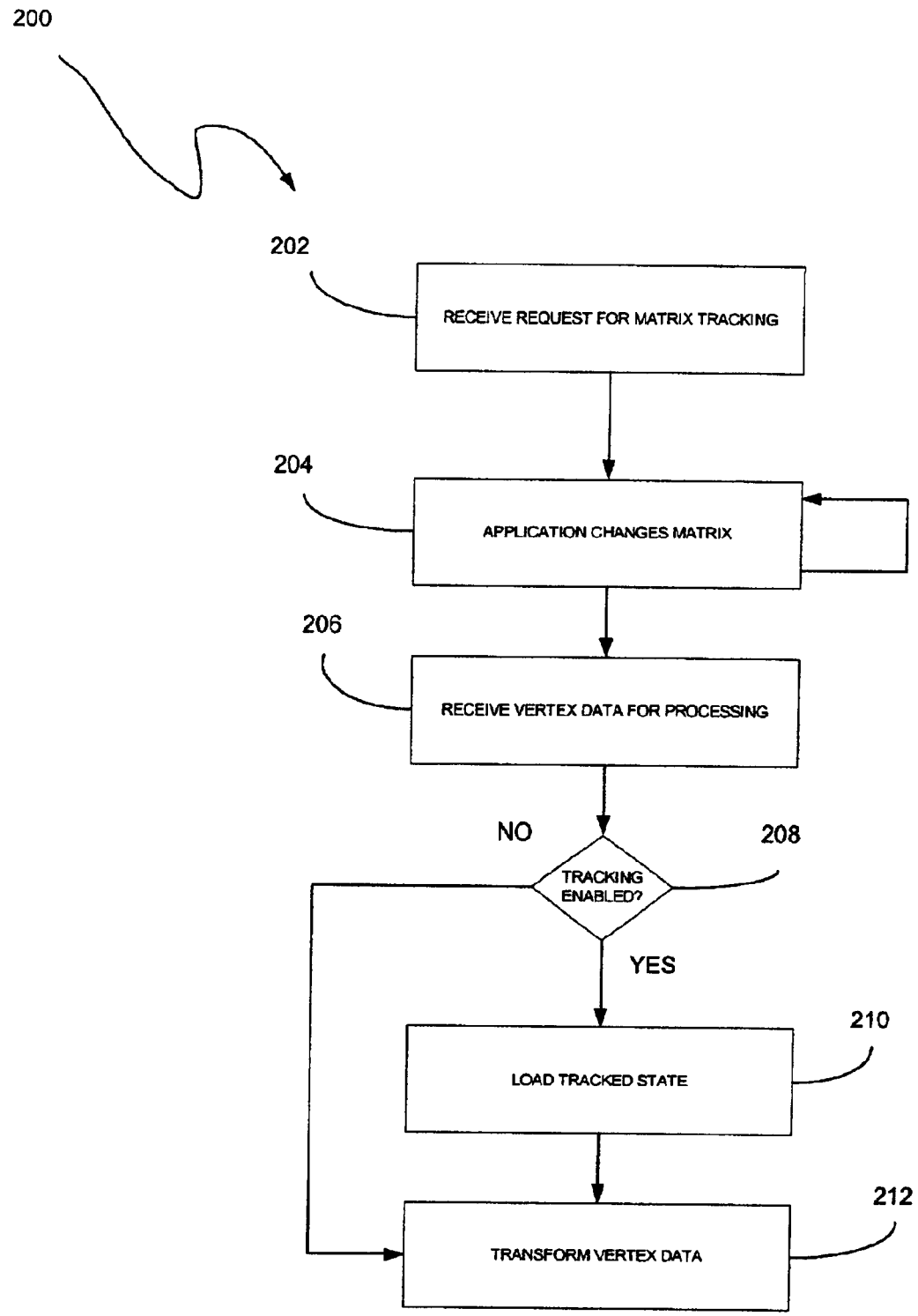
FIG. 2 is a flowchart illustrating a method for tracking a matrix during vertex processing, in accordance with one embodiment of the present invention.

FIG. 2 illustrates a method 200 for tracking a matrix during vertex processing. Initially, in operation 202, a request is received to track a matrix. Such request may include the receipt of a command and various parameters (as will be set forth hereinafter), a start signal, and/or any other type of request that initiates the tracking process. The matrix may be identified in the request. As will soon become apparent, this may be accomplished utilizing the parameter associated with the aforementioned command, and/or any other type of identifying entity. In one aspect of the present embodiment, a version and/or type of the matrix may be identified in the request.

During vertex processing, the matrix may change states, as indicated in operation 204. In the present description, a state of the matrix refers any "form," "variation," "version," or "type" the matrix may take. Just by way of example, the matrix may include various states including, but not limited to an inverse matrix, a transpose matrix, an inverse-transpose matrix, a modelview matrix, a projection matrix, a texture matrix, and a color matrix. The present method 200 is capable of monitoring each of such states.

In use, vertex data is received for vertex processing in operation 206 after which a state of at least one matrix may be tracked. In the present description, the vertex data may refer to any information, value, etc. associated with a particular vertex. As such, the vertex data may be processed with a current state of the matrix. In one aspect of the present embodiment, the tracking may include assigning an identifier to each of a plurality of states associated with the matrix. As such, the identifier assigned to the current state may be indicated for the vertex processing.

At various points during the method 200 of FIG. 2, the tracking may be selectively disabled. As such, it is determined in decision 208 as to whether the tracking is currently disabled. If so, the vertex data may simply be processed, i.e. transformed without loading the current state of the matrix. Note operation 212. In one aspect of the present embodiment, the state of the matrix may be maintained as a last-tracked state if the tracking is disabled.

If, however, it is determined that tracking is not disabled in decision 208, the identified matrix is tracked for use during vertex processing. Such tracking allows a current state to be loaded when required by an application. Note operation 210. It should be noted that the current state may be loaded automatically and/or manually.

Figure 3:
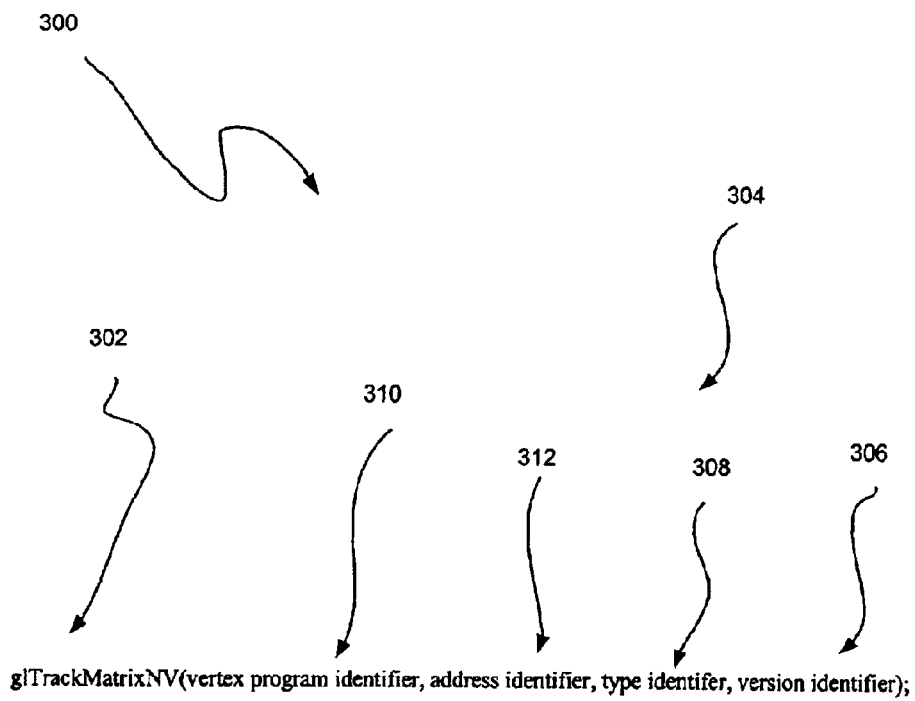
FIG. 3 illustrates a data structure stored in memory for tracking a matrix during vertex processing.

FIG. 3 illustrates a data structure 300 that may be stored in memory for tracking a matrix during vertex processing. Such data structure 300 includes a command 302 for requesting a matrix to be tracked. Further, the command 302 includes an identifier 304 for identifying the matrix. In use, the identified matrix is tracked for vertex processing upon execution of the command 302.

In various aspects of the present embodiment, the command 302 may include a version identifier 306 for identifying a version of the matrix. Such version may include an inverse version, a transpose version, and/or an inverse-transpose version. Still yet, the command 302 may include a type identifier 308 for identifying a type of the matrix. Such type may include a modelview type, a projection type, a texture type, and/or a color type. Also, the command 302 may include an address identifier 312 for identifying an address to be used during tracking of the matrix.

The command may also include a vertex program identifier 310 which identifies a "target" for allowing the matrix tracking API to be extended to other types of graphics-related programmability, i.e. per-pixel programs or per-fragment programs. In one embodiment, the vertex program identifier 310 may indicate "GL_VERTEX_PROGRAM_NV."

Use of the command 302 in an application thus provides a way of telling an OpenGL® driver that the matrix state used by conventional vertex processing may be "tracked" into specified vertex program parameters. This permits an application to manipulate matrices using a OpenGL® pre-existing API.

For example, a modelview matrix may be configured to automatically be tracked into vertex program parameters 20 through 23 (a 4×4 matrix is stored as 4 4-element rows). An exemplary command to request this matrix tracking is shown in Table 2.

It should be noted that, in the present description, OpenGL® API commands and tokens are prefixed by "gl" and "GL_," respectively. Also, OpenGL® extension commands and tokens are, by convention, suffixed by "NV" or "_NV," respectively. When the context is clear, such prefixes and suffices are dropped for brevity and clarity.

TABLE 2 glTrackMatrixNV(GL_VERTEX_PROGRAM_NV, 20, GL_MODELVIEW, GL_IDENTITY_NV);

Often other versions of conventional matrices are required. While positions are transformed by the matrix itself, planes are transformed by the matrix's inverse and normals are transformed by the matrix's inverse transpose. The tracking mechanism can also be used to track inverse, transpose, and inverse transpose versions of conventional matrices. For example, to transform normals, the command of Table 2A can request that the inverse transpose model-view matrix be tracked in addresses 24–27.

TABLE 2A glTrackMatrixNV(GL_VERTEX_PROGRAM_NV, 24, GL_MODELVIEW, GL_INVERSE_TRANSPOSE_NV);

Then, the vertex program may use an instruction sequence of operations to transform positions into eye-space for further lighting computations. See Table 2B.

TABLE 2B

DP4 R0.x, c[20], v[OPOS];
DP4 R0.y, c[21], v[OPOS];
DP4 R0.z, c[22], v[OPOS];
DP4 R0.w, c[23], v[OPOS];

Moreover, the vertex program may use a sequence of operations to transform normals into eye-space for further lighting computations. See Table 2C.

TABLE 2C

DP3 R1.x, c[24], v[NRML];
DP3 R1.y, c[25], v[NRML];
DP3 R1.z, c[26], v[NRML];

As mentioned earlier, the present extension may support all conventional OpenGL® matrices: Modelview, Projection, Texture (one per texture unit), and Color. It is also standard practice to transform positions by the value of the modelview and projection transforms. For this reason, the concatenation of the modelview and projection matrices can be tracked as well. Because vertex programs demand extra flexibility, generic matrices not otherwise used by conventional vertex processing can be both manipulated using the conventional matrix manipulation API and tracked using the present matrix tracking.

In addition to GL's conventional matrices, several additional matrices are available for tracking. These matrices have names of the form MATRIXi_NV where i is between zero and n−1 where n is the value of the MAX_TRACK_MATRICES_NV implementation dependent constant. The MATRIXi_NV constants obey MATRIXi_NV= MATRIX0_NV+i. The value of MAX_TRACK_MATRICES_NV may be at least eight. The maximum stack depth for tracking matrices is defined by the MAX_TRACK_MATRIX_STACK_DEPTH_NV and maybe at least 1.

The command 302 of FIG. 3 thus tracks a given transformed state of a particular matrix into a contiguous sequence of four vertex program parameter registers beginning at an address indicated by the address identifier 312, and/or some default address. The vertex program identifier may be VERTEX_PROGRAM_NV (though tracked matrices apply to vertex state programs as well because both vertex state programs and vertex programs shared the same program parameter registers). The type identifier 308 may be one of NONE, MODELVIEW, PROJECTION, TEXTURE, COLOR (if the ARB_imaging subset is supported), MODELVIEW_PROJECTION_NV, or MATRIXi_NV. The version identifier 306 may be one of IDENTITY_NV, INVERSE_NV, TRANSPOSE_NV, or INVERSE_TRANSPOSE_NV. An INVALID_VALUE error may also be generated if the address is not a multiple of four.

The MODELVIEW_PROJECTION_NV matrix represents the concatenation of the current modelview and projection matrices. If M is the current modelview matrix and P is the current projection matrix, then the MODELVIEW_PROJECTION_NV matrix is C, and computed as C=PM.

Matrix tracking for the specified program parameter register and the next consecutive three registers is disabled when NONE is supplied for matrix. When tracking is disabled, the previously tracked program parameter registers retain the state of their last tracked values. Otherwise, the specified transformed version of matrix is tracked into the specified program parameter register and the next three registers. Whenever the matrix changes, the transformed version of the matrix is updated in the specified range of program parameter registers. If TEXTURE is specified for matrix, the texture matrix for the current active texture unit is tracked.

Matrices may be tracked "row-wise" meaning that the top row of the transformed matrix is loaded into the program parameter address, the second from the top row of the transformed matrix is loaded into the program parameter address+1, the third from the top row of the transformed matrix is loaded into the program parameter address+2, and the bottom row of the transformed matrix is loaded into the program parameter address+3. The transformed matrix may be identical to the specified matrix, the inverse of the specified matrix, the transpose of the specified matrix, or the inverse transpose of the specified matrix, depending on the value of transform.

When matrix tracking is enabled for a particular program parameter register sequence, updates to the program parameter using ProgramParameterNV commands, a vertex program, or a vertex state program are not possible. The INVALID_OPERATION error is generated if a ProgramParameterNV command is used to update a program parameter register currently tracking a matrix.

When a vertex program that writes a program parameter register with tracking enabled is bound using BindProgramNV, the vertex program is considered invalid. The INVALID_OPERATION error is generated by Begin, RasterPos, or a command that does an implicit Begin operation when the current vertex program is invalid.

The INVALID_OPERATION error is generated by ExecuteProgramNV when the vertex state program requested for execution writes to a program parameter register that is currently tracking a matrix because the program is considered invalid.

When a matrix has been tracked into a set of program parameters and glTrackMatrixNV(GL_VERTEX_PROGRAM_NV, addr, GL_NONE, GL_IDENTITY_NV) is performed, the specified program parameters stop tracking a matrix, but retain the values of the matrix they were last tracking.

One example of how a matrix is tracked is set forth in See Table 2D.

TABLE 2D

```
GLfloat matrix[16] =  { 1, 5, 9, 13,
                        2, 6, 10, 14,
                        3, 7, 11, 15,
                        4, 8, 12, 16 };
GLfloat row1 [4], row2 [4];
glMatrixMode(GL_MATRIX0_NV);
glLoadMatrixf(matrix);
glTrackMatrixNV(GL_VERTEX_PROGRAM_NV, 4,
GL_MATRIX0_NV, GL_IDENTITY_NV);
glTrackMatrixNV(GL_VERTEX_PROGRAM_NV, 8,
GL_MATRIX0_NV, GL_TRANSPOSE_NV);
glGetProgramParameterfvNV(GL_VERTEX_PROGRAM_NV, 5,
GL_PROGRAM_PARAMETER_NV, row1);
/* row1 is now [ 2 6 10 14 ] */
glGetProgramParameterfvNV(GL_VERTEX_PROGRAM_NV, 9,
GL_PROGRAM_PARAMETER_NV, row2);
/* row2 is now [ 5 6 7 8 ] because the tracked matrix is
transposed */
```

The projection matrix and model-view matrix are set and modified with a variety of commands. The affected matrix is determined by the current matrix mode. The current matrix mode is set with void MatrixMode(enum mode); which takes one of the pre-defined constants TEXTURE, MODELVIEW, COLOR, PROJECTION, or MATRIXi_

NV as the argument. In the case of MATRIXi_NV, i is an integer between 0 and n−1 indicating one of n tracking matrices where n is the value of the implementation defined constant MAX_TRACK_MATRICES_NV.

If the current matrix mode is MODELVIEW, then matrix operations apply to the model-view matrix; if PROJECTION, then they apply to the projection matrix.

The state required to implement transformations consists of a n-value integer indicating the current matrix mode (where n is 4+the number of tracking matrices supported), a stack of at least two 4×4 matrices for each of COLOR, PROJECTION, and TEXTURE with associated stack pointers, n stacks (where n is at least 8) of at least one 4×4 matrix for each MATRIXi_NV with associated stack pointers, and a stack of at least 32 4×4 matrices with an associated stack pointer for MODELVIEW. Initially, there is only one matrix on each stack, and all matrices are set to the identity. The initial matrix mode is MODELVIEW.

Vertex Attribute Aliasing

Aliasing may make it easy to use vertex programs with existing OpenGL® code that transfers per-vertex parameters using conventional OpenGL® per-vertex calls. It also minimizes the number of per-vertex parameters that the hardware may maintain.

Figure 4:
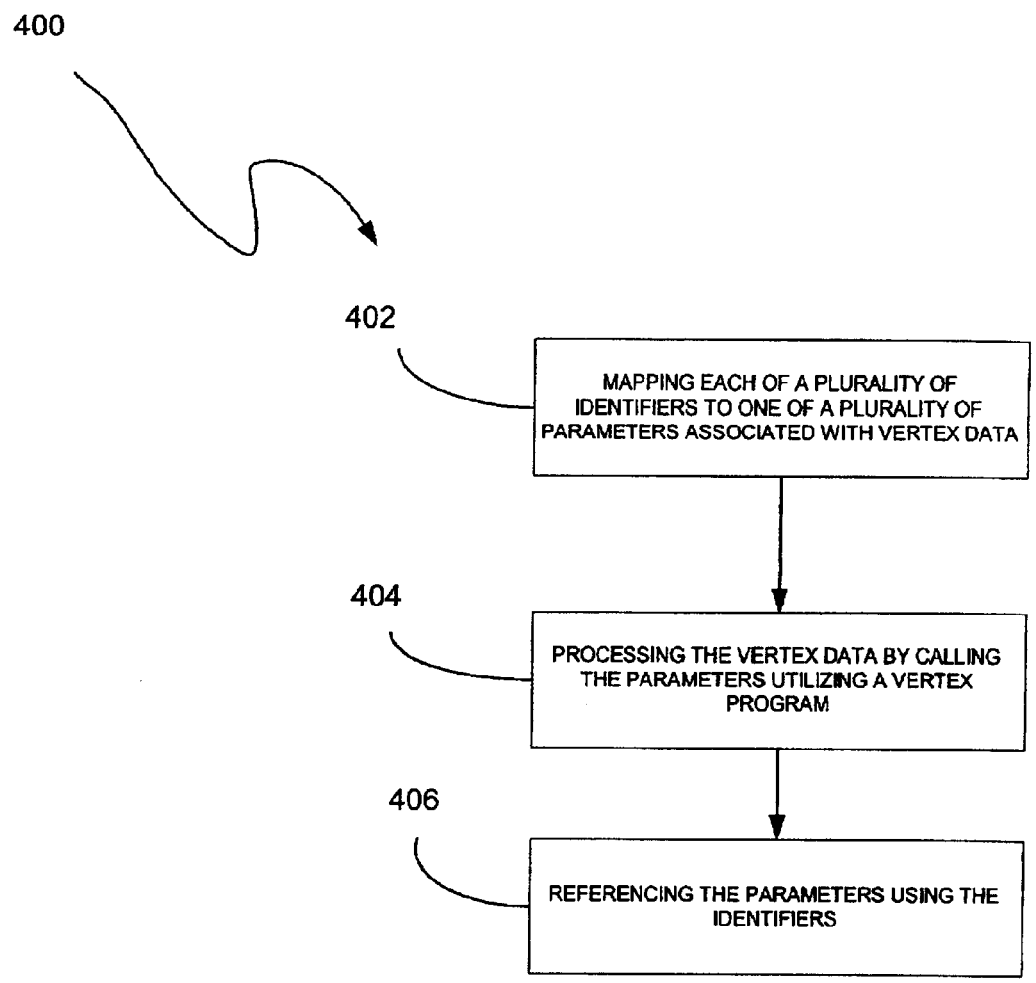
FIG. 4 shows a method for aliasing vertex attributes during vertex processing, in accordance with one embodiment of the present invention.

FIG. 4 illustrates a method 400 for aliasing vertex attributes during vertex processing. Initially, in operation 402, a plurality of identifiers are each mapped to one of a plurality of parameters associated with vertex data. In one embodiment of the present invention, the parameters may include per-vertex parameters. For example, the parameters may include vertices, normals, colors, fog coordinates, vertex weights, and/or texture coordinates.

Thereafter, in operation 404, the vertex data is processed. As shown in operation 406, the parameters are called utilizing a vertex program capable of referencing the parameters using the identifiers.

As such, the parameters may be capable of being called by an alias or a conventional semantic name associated with the parameters. As such, a need for defining additional semantic names for the parameters is avoided as a result of the aliasing.

FIG. 5 illustrates a data structure 500 provided for aliasing vertex attributes during vertex processing. Such data structure 500 may include a table 502 that maps each of a plurality of identifiers 504 to one of a plurality of parameters 506 associated with vertex data. As such, the vertex data may be processed by calling the parameters utilizing a vertex program capable of referencing the parameters using the table 502.

Rather than add additional generic vertex attributes to the set of existing attributes (the convention of prior art), one may thus alias the 16 vertex attributes for application-programmability with the conventional vertex attributes. This allows the present interface to accept vertex attributes with "names" or "numbers". Moreover, this allows old source code that renders 3D geometry using the conventional way of sending per-vertex attributes (whether using immediate mode commands, display lists, or vertex arrays) can remain unchanged while still using vertex programs.

One may apply this aliasing concept to all of the following aspects of the OpenGL® API including, but not limited to:
  Immediate mode.
  Display lists.
  Vertex arrays.
  Evaluators (for rendering surfaces).

In the particular case of vertex arrays, the existing conventional vertex arrays exist, but there is an additional set of vertex attribute arrays (that take precedence to the conventional vertex arrays when enabled).

Applying aliasing to all these aspects of the API allow 3D application developers to make the minimum changes to existing 3D application source code to use vertex programs. In practice, this means 3D application developers create, bind to, and enable vertex programs, but otherwise leave the routines that send geometry to the OpenGL® unchanged.

One important distinction between the conventional GL vertex transformation mode and the vertex program mode is that per-vertex parameters and other state parameters in vertex program mode do not have dedicated semantic interpretations the way that they do with the conventional GL vertex transformation mode.

For example, in the conventional GL vertex transformation mode, the Normal command specifies a per-vertex normal. The semantic that the Normal command supplies a normal for lighting is established because that is how the per-vertex attribute supplied by the Normal command is used by the conventional GL vertex transformation mode. Similarly, other state parameters such as a light source position have semantic interpretations based on how the conventional GL vertex transformation model uses each particular parameter.

In contrast, vertex attributes and program parameters for vertex programs have no pre-defined semantic meanings. The meaning of a vertex attribute or program parameter in vertex program mode is defined by how the vertex attribute or program parameter is used by the current vertex program to compute and write values to vertex result registers. This is the reason that per-vertex attributes and program parameters for vertex programs are numbered instead of named.

As mentioned earlier, the existing per-vertex parameters for the conventional GL vertex transformation mode (vertices, normals, colors, fog coordinates, vertex weights, and texture coordinates) are aliased to numbered vertex attributes. Such aliasing is specified in the table 502 of FIG. 5. The table 502 includes how the various conventional components map to the 4-component vertex attribute components.

Only vertex attribute zero is treated specially because it is the attribute that provokes the execution of the vertex program; this is the attribute that aliases to the vertex command's vertex coordinates.

The result of a vertex program is the set of post-transformation vertex parameters written to the vertex result registers. All vertex programs may write a homogeneous clip space position, but the other vertex result registers can be optionally written.

Clipping and culling are not normally the responsibility of vertex programs because these operations assume the assembly of multiple vertices into a primitive. View frustum clipping is performed subsequent to vertex program execution. Clip planes are not supported in vertex program mode.

Coordinate Transformations

Per-vertex parameters are transformed before the transformation results are used to generate primitives for rasterization, establish a raster position, or generate vertices for selection or feedback.

Each vertex's per-vertex parameters are transformed by one of two vertex transformation modes. The first vertex transformation mode is GL's conventional vertex transformation model. The second mode, known as 'vertex program' mode, transforms the vertex's per-vertex parameters by an application-supplied vertex program.

Vertex program mode is enabled and disabled, respectively, by void Enable(enum target); and void Disable (enum target); with target equal to VERTEX_PROGRAM_NV. When vertex program mode is enabled, vertices are transformed by the currently bound vertex program.

When vertex program mode is disabled, vertices, normals, and texture coordinates are transformed before their coordinates are used to produce an image in the frame buffer. A description will now be set forth as to how vertex coordinates are transformed and how the transformation is controlled in the case when vertex program mode is disabled.

Vertex Attribute Registers

The vertex program register set consists of five types of registers described hereinafter in greater detail.

The vertex attribute registers are sixteen 4-component vector floating-point registers containing the current vertex's per-vertex attributes. These registers are numbered 0 through 15. These registers are private to each vertex program invocation and are initialized at each vertex program invocation by the current vertex attribute state specified with VertexAttribNV commands. These registers are read-only during vertex program execution. The VertexAttribNV commands used to update the vertex attribute registers can be issued both outside and inside of Begin/End pairs. Vertex program execution is provoked by updating vertex attribute zero. Updating vertex attribute zero outside of a Begin/End pair is ignored without generating any error (identical to the Vertex command operation).

The commands void VertexAttrib{1234}{sfd}NV(uint index, T coords);

void VertexAttrib{1234}{sfd}vNV(uint index, T coords);

void VertexAttrib4ubNV(uint index, T coords);

void VertexAttrib4ubvNV(uint index, T coords);

specify the particular current vertex attribute indicated by index.

The coordinates for each vertex attribute are named x, y, z, and w. The VertexAttrib1NV family of commands sets the x coordinate to the provided single argument while setting y and z to 0 and w to 1. Similarly, VertexAttrib2NV sets x and y to the specified values, z to 0 and w to 1; VertexAttrib3NV sets x, y, and z, with w set to 1, and VertexAttrib4NV sets all four coordinates. The error INVALID_VALUE is generated if index is greater than 15.

No conversions are applied to the vertex attributes specified as type short, int, float, or double. However, vertex attributes specified as type ubyte may be converted.

The commands void VertexAttribs{1234}{sifd}vNV(uint index, sizei n, T coords[ ]);

void VertexAttribs4ubvNV(uint index, sizei n, GLubyte coords[ ]); specify a contiguous set of n vertex attributes. The effect of VertexAttribs{1234}{sfd ub}vNV(index, n, coords) is the same as the command sequence #define NUM k/* where k is 1, 2, 3, or 4 components */int i; for (i=n-1; i>=0; i--) {VertexAttrib{NUM}{sfd}vNV(i+index, &coords[i*NUM]);}.

VertexAttribs4ubvNV behaves similarly. The VertexAttribNV calls equivalent to VertexAttribsNV are issued in reverse order so that vertex program execution is provoked when index is zero only after all the other vertex attributes have first been specified.

Program Parameter Registers

The program parameter registers are ninety-six 4-component floating-point vector registers containing the vertex program parameters. These registers are numbered 0 through 95. This relatively large set of registers is intended to hold parameters such as matrices, lighting parameters, and constants required by vertex programs. Vertex program parameter registers can be updated in one of two ways: by the ProgramParameterNV commands outside of a Begin/End pair or by a vertex state program executed outside of a Begin/End pair.

The commands void ProgramParameter4fNV(enum target, uint index, float x, float y, float z, float w);

void ProgramParameter4dNV(enum target, uint index, double x, double y, double z, double w);

specify the particular program parameter indicated by index. The coordinates values x, y, and z are assigned to the respective components of the particular program parameter. Target may be VERTEX_PROGRAM_NV.

The commands void ProgramParameter4dvNV(enum target, uint index, double *params);

void ProgramParameter4fvNV(enum target, uint index, float *params);

operate identically to ProgramParameter4fNV and ProgramParameter4dNV respectively except that the program parameters are passed as an array of four components.

The commands void ProgramParameters4dvNV(enum target, uint index, uint num, double *params);

void ProgramParameters4fvNV(enum target, uint index, uint num, float *params);

specify a contiguous set of num program parameters. The effect is the same as for (i=index; i<index+num; i++) {ProgramParameter4{fd}vNV(i, params+i*4);}.

The program parameter registers are shared to all vertex program invocations within a rendering context. ProgramParameterNV command updates and vertex state program executions are serialized with respect to vertex program invocations and other vertex state program executions.

Writes to the program parameter registers during vertex state program execution can be maskable on a per-component basis.

The error INVALID_VALUE is generated if any ProgramParameterNV has an index is greater than 95.

The initial value of all ninety-six program parameter registers is (0,0,0,0).

Address Register

The Address Register is a single 4-component vector signed 32-bit integer register though only the x component of the vector is accessible. The register is private to each vertex program invocation and is initialized to (0,0,0,0) at every vertex program invocation. This register can be written during vertex program execution (but not read) and its value can be used for as a relative offset for reading vertex program parameter registers. Only the vertex program parameter registers can be read using relative addressing (writes using relative addressing are not supported).

Temporary Registers

The Temporary Registers are twelve 4-component floating-point vector registers used to hold temporary results during vertex program execution. These registers are numbered 0 through 11. These registers are private to each vertex program invocation and initialized to (0,0,0,0) at every vertex program invocation. These registers can be read and written during vertex program execution. Writes to these registers can be maskable on a per-component basis.

Vertex Result Register Set

The Vertex Result Registers are fifteen 4-component floating-point vector registers used to write the results of a vertex program. Each register value is initialized to (0,0,0,1)

at the invocation of each vertex program. Writes to the vertex result registers can be maskable on a per-component basis. These registers are named in Table 2E and further discussed below.

TABLE 2E

| Vertex Result Register Name | Description | Component Interpretation |
|---|---|---|
| HPOS | Homogeneous clip space position | (x, y, z, w) |
| COL0 | Primary color (front-facing) | (r, g, b, a) |
| COL1 | Secondary color (front-facing) | (r, g, b, a) |
| BFC0 | Back-facing primary color | (r, g, b, a) |
| BFC1 | Back-facing secondary color | (r, g, b, a) |
| FOGC | Fog coordinate | (f, *, *, *) |
| PSIZ | Point size | (p, *, *, *) |
| TEX0 | Texture coordinate set 0 | (s, t, r, q) |
| TEX1 | Texture coordinate set 1 | (s, t, r, q) |
| TEX2 | Texture coordinate set 2 | (s, t, r, q) |
| TEX3 | Texture coordinate set 3 | (s, t, r, q) |
| TEX4 | Texture coordinate set 4 | (s, t, r, q) |
| TEX5 | Texture coordinate set 5 | (s, t, r, q) |
| TEX6 | Texture coordinate set 6 | (s, t, r, q) |
| TEX7 | Texture coordinate set 7 | (s, t, r, q) |

HPOS is the transformed vertex's homogeneous clip space position. The vertex's homogeneous clip space position is converted to normalized device coordinates and transformed to window coordinates. Further processing (subsequent to vertex program termination) is responsible for clipping primitives assembled from vertex program-generated vertices, but all client-defined clip planes are treated as if they are disabled when vertex program mode is enabled.

Four distinct color results can be generated for each vertex. COL0 is the transformed vertex's front-facing primary color. COL1 is the transformed vertex's front-facing secondary color. BFC0 is the transformed vertex's back-facing primary color. BFC1 is the transformed vertex's back-facing secondary color.

Primitive coloring may operate in two-sided color mode. This behavior is enabled and disabled by calling Enable or Disable with the symbolic value VERTEX_PROGRAM_TWO_SIDE_NV. The selection between the back-facing colors and the front-facing colors depends on the primitive of which the vertex is a part. If the primitive is a point or a line segment, the front-facing colors are always selected. If the primitive is a polygon and two-sided color mode is disabled, the front-facing colors are selected. If it is a polygon and two-sided color mode is enabled, then the selection is based on the sign of the (clipped or unclipped) polygon's signed area computed in window coordinates. This facingness determination is identical to the two-sided lighting facingness determination.

The selected primary and secondary colors for each primitive are clamped to the range [0,1] and then interpolated across the assembled primitive during rasterization with at least 8-bit accuracy for each color component.

FOGC is the transformed vertex's fog coordinate. The register's first floating-point component is interpolated across the assembled primitive during rasterization and used as the fog distance to compute per-fragment the fog factor when fog is enabled. However, if both fog and vertex program mode are enabled, but the FOG vertex result register is not written, the fog factor is overridden to 1.0. The register's other three components are ignored.

Point size determination may operate in program-specified point size mode. This behavior is enabled and disabled by calling Enable or Disable with the symbolic value VERTEX_PROGRAM_POINT_SIZE_NV. If the vertex is for a point primitive and the mode is enabled and the PSIZ vertex result is written, the point primitive's size is determined by the clamped x component of the PSIZ register. Otherwise (because vertex program mode is disabled, program-specified point size mode is disabled, or because the vertex program did not write PSIZ), the point primitive's size is determined by the point size state (the state specified using the PointSize command).

The PSIZ register's x component is clamped to the range zero through either the hi value of ALIASED_POINT_SIZE_RANGE if point smoothing is disabled or the hi value of the SMOOTH_POINT_SIZE_RANGE if point smoothing is enabled. The register's other three components are ignored.

If the vertex is not for a point primitive, the value of the PSIZ vertex result register is ignored.

TEX0 through TEX7 are the transformed vertex's texture coordinate sets for texture units 0 through 7. These floating-point coordinates are interpolated across the assembled primitive during rasterization and used for accessing textures. If the number of texture units supported is less than eight, the values of vertex result registers that do not correspond to existent texture units are ignored.

Vertex Program Specification

Vertex programs are specified as an array of ubytes. The array is a string of ASCII characters encoding the program. The command LoadProgramNV(enum target, uint id, sizei len, const ubyte *program);

loads a vertex program when the target parameter is VERTEX_PROGRAM_NV. Multiple programs can be loaded with different names. ID names the program to load. The name space for programs is the positive integers (zero is reserved). The error INVALID_VALUE occurs if a program is loaded with an ID of zero. The error INVALID_OPERATION is generated if a program is loaded for an ID that is currently loaded with a program of a different program target. Managing the program name space and binding to vertex programs is discussed hereinafter in greater detail.

A second program target type known as vertex state programs is discussed hereinafter.

At program load time, the program is parsed into a set of tokens possibly separated by white space. Spaces, tabs, newlines, carriage returns, and comments are considered whitespace. Comments begin with the character "#" and are terminated by a newline, a carriage return, or the end of the program array.

The Backus-Naur Form (BNF) grammar specifies the syntactically valid sequences for vertex programs. The set of valid tokens can be inferred from the grammar. The token " " represents an empty string and is used to indicate optional rules. A program is invalid if it contains any undefined tokens or characters. Note Table 2F.

TABLE 2F

| | | |
|---|---|---|
| <program> | ::= | "!!VP1.0" <instructionSequence> "END" |
| <instructionSequence> | ::= | <instructionSequence> <instructionLine> \| <instructionLine> |
| instructionLine> | ::= | <instruction> ";" |
| <instruction> | ::= | <ARL-instruction> |
| | | <VECTORop-instruction> |
| | | <SCALARop-instruction> |
| | | <BINop-instruction> |
| | | <TRIop- instruction> |
| ARL-instruction> | ::= | "ARL" <addrReg> "," <scalarSrcReg> |

TABLE 2F-continued

| | |
|---|---|
| <VECTORop-instruction> | ::= <VECTORop> <maskedDstReg> "," <swizzleSrcReg> |
| <SCALARop-instruction> | ::= <SCALARop> <maskedDstReg> "," <scalarSrcReg> |
| <BINop-instruction> | ::= <BINop> <maskedDstReg> "," <swizzleSrcReg> "," <swizzleSrcReg> |
| <TRIop-instruction> | ::= <TRIop> <maskedDstReg> "," <swizzleSrcReg> "," <swizzleSrcReg> "," <swizzleSrcReg> |
| <VECTORop> | ::= "MOV"\| "LIT" |
| <SCALARop> | ::= "RCP" \| "RSQ" \| "EXP" \| "LOG" |
| <BINop> | ::= "MUL" \| "ADD" \| "DP3" \| "DP4" \| "DST" \| "MIN" \| "MAX" \| "SLT" \| "SGE" |
| <TRIop> | ::= "MAD" |
| <scalarSrcReg> <scalarSuffix> | ::= <optionalSign> <srcReg> |
| <swizzleSrcReg> <swizzleSuffix> | ::= <optionalSign> <srcReg> |
| <maskedDstReg> | ::= <dstReg> <optionalMask> |
| <optionalMask> | ::= " " <br> \| "." "x" <br> \| "." "y" <br> \| "." "x" "y" <br> \| "." "z" <br> \| "." "x" "z" <br> \| "." "y" "z" <br> \| "." "x" "y" "z" <br> \| "." "w" <br> \| "." "x" "w" <br> \| "." "y" "w" <br> \| "." "x" "y" "w" <br> \| "." "z" "w" <br> \| "." "x" "z" "w" <br> \| "." "y" "z" "w" <br> \| "." "x" "y" "z" "w" |
| <optionalSign> | ::= "–" <br> \| " " |
| <srcReg> | ::= <vertexAttribReg> <br> \| <progParamReg> <br> \| <temporaryReg> |
| <dstReg> | ::= <temporaryReg> <br> \| <vertexResultReg> |
| <vertexAttribReg> | ::= "v" "[" vertexAttribRegNum "]" |
| <vertexAttribRegNum> | ::= decimal integer from 0 to 15 inclusive <br> \| "OPOS" <br> \| "WGHT" <br> \| "NRML" <br> \| "COL0" <br> \| "COL1" <br> \| "FOGC" <br> \| "TEX0" <br> \| "TEX1" <br> \| "TEX2" <br> \| "TEX3" <br> \| "TEX4" <br> \| "TEX5" <br> \| "TEX6" <br> \| "TEX7" |
| <progParamReg> | ::= <absProgParamReg> <br> \| <relProgParamReg> |
| <absProgParamReg> | ::= "c" "[" <progParamRegNum> "]" |
| <progParamRegNum> | decimal integer from 0 to 95 inclusive |
| <relProgParamReg> | ::= "c" "[" <addrReg> "]" <br> \| "c" "[" <addrReg> "+" <progParamPosOffset> "]" <br> \| "c" "[" <addrReg> "–" <progParamNegOffset> "]" |
| <progParamPosOffset> | ::= decimal integer from 0 to 63 inclusive |
| <progParamNegOffset> | ::= decimal integer from 0 to 64 inclusive |
| <addrReg> | ::= "A0" "." "x" |
| <temporaryReg> | ::= "R0" <br> \| "R1" <br> \| "R2" <br> \| "R3" <br> \| "R4" <br> \| "R5" <br> \| "R6" <br> \| "R7" <br> \| "R8" <br> \| "R9" <br> \| "R10" <br> \| "R11" |
| <vertexResultReg> | ::= "o" "[" vertexResultRegName "]" |
| <vertexResultRegName> | ::= "HPOS" <br> \| "COL0" <br> \| "COL1" <br> \| "BFC0" <br> \| "BFC1" <br> \| "FOGC" <br> \| "PSIZ" <br> \| "TEX0" <br> \| "TEX1" <br> \| "TEX2" <br> \| "TEX3" <br> \| "TEX4" <br> \| "TEX5" <br> \| "TEX6" <br> \| "TEX7" |
| <scalarSuffix> | ::= "." <component> |
| <swizzleSuffix> | ::= " " <br> \| "." <component> <br> \| "." <component> <component> <component> <component> |
| <component> | ::= "x" <br> \| "y" <br> \| "z" <br> \| "w" |

The <vertexAttribRegNum> rule matches both register numbers 0 through 15 and a set of mnemonics that abbreviate the aliasing of conventional the per-vertex parameters to vertex attribute register numbers. Table 2G shows the mapping from mnemonic to vertex attribute register number and what the mnemonic abbreviates.

TABLE 2G

| Vertex Attribute Mnemonic | Register Number | Meaning |
|---|---|---|
| "OPOS" | 0 | object position |
| "WGHT" | 1 | vertex weight |
| "NRML" | 2 | normal |
| "COL0" | 3 | primary color |
| "COL1" | 4 | secondary color |
| "FOGC" | 5 | fog coordinate |
| "TEX0" | 8 | texture coordinate 0 |
| "TEX1" | 9 | texture coordinate 1 |
| "TEX2" | 10 | texture coordinate 2 |
| "TEX3" | 11 | texture coordinate 3 |
| "TEX4" | 12 | texture coordinate 4 |
| "TEX5" | 13 | texture coordinate 5 |
| "TEX6" | 14 | texture coordinate 6 |
| "TEX7" | 15 | texture coordinate 7 |

Additional details of operation are as follows:
Vertex programs fails to load if it does not write at least one.
component of the HPOS register.
A vertex program fails to load if it contains more than 128 instructions.

A vertex program fails to load if any instruction sources more than one unique program parameter register.

A vertex program fails to load if any instruction sources more than one unique vertex attribute register.

The error INVALID_OPERATION is generated if a vertex program fails to load because it is not syntactically correct or for one of the semantic restrictions listed above.

The error INVALID_OPERATION is generated if a program is loaded for ID when ID is currently loaded with a program of a different target.

A successfully loaded vertex program is parsed into a sequence of instructions. Each instruction is identified by its tokenized name.

A successfully loaded program replaces the program previously assigned to the name specified by id. If the OUT_OF_MEMORY error is generated by LoadProgramNV, no change is made to the previous contents of the named program.

Querying the value of PROGRAM_ERROR_POSITION_NV returns a ubyte offset into the last loaded program string indicating where the first error in the program. If the program fails to load because of a semantic restriction that cannot be determined until the program is fully scanned, the error position may be len, the length of the program. If the program loads successfully, the value of PROGRAM_ERROR_POSITION_NV is assigned the value negative one.

Vertex Program Binding and Program Management

The current vertex program is invoked whenever vertex attribute zero is updated (whether by a VertexAttributeNV or Vertex command). The current vertex program is updated by BindProgramNV(enum target, uint id); where target may be VERTEX_PROGRAM_NV. This binds the vertex program named by ID as the current vertex program. The error INVALID_OPERATION is generated if ID names a program that is not a vertex program.

Binding to a nonexistent program ID does not generate an error. In particular, binding to program ID zero does not generate an error. However, because program zero cannot be loaded, program zero is always nonexistent. If a program ID is successfully loaded with a new vertex program and ID is also the currently bound vertex program, the new program is considered the currently bound vertex program.

The INVALID_OPERATION error is generated when both vertex program mode is enabled and Begin is called (or when a command that performs an implicit Begin is called) if the current vertex program is nonexistent or not valid.

Programs are deleted by calling void DeleteProgramsNV (sizei n, const uint *IDs); IDs contains n names of programs to be deleted. After a program is deleted, it becomes nonexistent, and its name is again unused. If a program that is currently bound is deleted, it is as though BindProgramNV has been executed with the same target as the deleted program and program zero. Unused names in IDs are silently ignored, as is the value zero.

The command void GenProgramsNV(sizei n, uint *IDs); returns n previously unused program names in IDs. These names are marked as used, for the purposes of GenProgramsNV only, but they become existent programs only when the are first loaded using LoadProgramNV. The error INVALID_VALUE is generated if n is negative.

An implementation may choose to establish a working set of programs on which binding and ExecuteProgramNV operations are performed with higher performance. A program that is currently part of this working set is said to be resident.

The command
boolean AreProgramsResidentNV(sizei n, const uint *IDs,boolean *residences);
returns TRUE if all of the n programs named in IDs are resident, or if the implementation does not distinguish a working set. If at least one of the programs named in IDs is not resident, then FALSE is returned, and the residence of each program is returned in residences. Otherwise the contents of residences are not changed. If any of the names in IDs are nonexistent or zero, FALSE is returned, the error INVALID_VALUE is generated, and the contents of residences are indeterminate. The residence status of a single named program can also be queried by calling GetProgramivNV with ID set to the name of the program and pname set to PROGRAM_RESIDENT_NV.

AreProgramsResidentNV indicates only whether a program is currently resident, not whether it could not be made resident. An implementation may choose to make a program resident only on first use, for example. The client may guide the GL implementation in determining which programs may be resident by requesting a set of programs to make resident.

The command void RequestResidentProgramsNV(sizei n, const uint *IDs); requests that the n programs named in IDs may be made resident. While all the programs are not guaranteed to become resident, the implementation may make a best effort to make as many of the programs resident as possible. As a result of making the requested programs resident, program names not among the requested programs may become non-resident. Higher priority for residency may be given to programs listed earlier in the IDs array. RequestResidentProgramsNV silently ignores attempts to make resident nonexistent program names or zero. AreProgramsResidentNV can be called after RequestResidentProgramsNV to determine which programs actually became resident.

Vertex Program Register Accesses

There are 17 vertex program instructions. The instructions and their respective input and output parameters are summarized in Table 2H.

TABLE 2H

| Opcode | Inputs (scalar or vector) | Output (vector or replicated scalar) | Operation |
|---|---|---|---|
| ARL | s | address register | address register load |
| MOV | v | v | move |
| MUL | v, v | v | multiply |
| ADD | v, v | v | add |
| MAD | v, v, v | v | multiply and add |
| RCP | s | ssss | reciprocal |
| RSQ | s | ssss | reciprocal square root |
| DP3 | v, v | ssss | 3-component dot product |
| DP4 | v, v | ssss | 4-component dot product |
| DST | v, v | v | distance vector |
| MIN | v, v | v | minimum |
| MAX | v, v | v | maximum |
| SLT | v, v | v | set on less than |
| SGE | v, v | v | set on greater equal than |
| EXP | s | v | exponential base 2 |
| LOG | s | v | logarithm base 2 |
| LIT | v | v | light coefficients |

A summary of vertex program instructions is as follows:

"v" indicates a vector input or output,

"s" indicates a scalar input, and

"ssss" indicates a scalar output replicated across a 4-component vector.

Instructions use either scalar source values or swizzled source values, indicated in the grammar by the rules <scalarSrcReg> and <swizzleSrcReg> respectively. Either type of source value is negated when the <optionalsign> rule matches "−".

Scalar source register values select one of the source register's four components based on the <component> of the <scalarSuffix> rule. The characters "x", "y", "z", and "w" match the x, y, z, and w components respectively. The indicated component is used as a scalar for the particular source value.

Swizzled source register values may arbitrarily swizzle the source register's components based on the <swizzleSuffix> rule. In the case where the <swizzleSuffix> matches (ignoring whitespace) the pattern ". . . " where each question mark is one of "x", "y", "z", or "w", this indicates the ith component of the source register value may come from the component named by the ith component in the sequence. For example, if the swizzle suffix is ".yzzx" and the source register contains [2.0, 8.0, 9.0, 0.0] the swizzled source register value used by the instruction is [8.0, 9.0, 9.0, 2.0].

If the <swizzleSuffix> rule matches " ", this is treated the same as ".xyzw". If the <swizzleSuffix> rule matches (ignoring whitespace) ".x", ".y", ".z", or ".w", these are treated the same as ".xxxx", ".yyyy", ".zzzz", and ".wwww" respectively.

The register sourced for either a scalar source register value or a swizzled source register value is indicated in the grammar by the rule <srcReg>. The <vertexAttribReg>, <progParamReg>, and <temporaryReg> sub-rules correspond to one of the vertex attribute registers, program parameter registers, or temporary register respectively.

The vertex attribute and temporary registers are accessed absolutely based on the numbered register. In the case of vertex attribute registers, if the <vertexAttribRegNum> corresponds to a mnemonic, the corresponding register number.

Either absolute or relative addressing can be used to access the program parameter registers. Absolute addressing is indicated by the grammar by the <absProgParamReg> rule. Absolute addressing accesses the numbered program parameter register indicated by the <progParamRegNum> rule. Relative addressing accesses the numbered program parameter register plus an offset. The offset is the positive value of <progParamPosOffset> if the <progParamPosOffset> rule is matched, or the offset is the negative value of <progParamNegOffset> if the <progParamNegOffset> rule is matched, or otherwise the offset is zero. Relative addressing is available only for program parameter registers and only for reads (not writes). Relative addressing reads outside of the 0 to 95 inclusive range always read the value (0,0,0,0).

The result of all instructions except ARL is written back to a masked destination register, indicated in the grammar by the rule <maskedDstReg>.

Writes to each component of the destination register can be masked, indicated in the grammar by the <optionalMask> rule. If the optional mask is " ", all components are written. Otherwise, the optional mask names particular components to write. The characters "x", "y", "z", and "w" match the x, y, z, and w components respectively. For example, an optional mask of ".xzw" indicates that the x, z, and w components may be written but not the y component. The grammar requires that the destination register mask components may be listed in "xyzw" order.

The actual destination register is indicated in the grammar by the rule <dstReg>. The <temporaryReg> and <vertexResultReg> sub-rules correspond to either the temporary registers or vertex result registers.

The vertex result registers are accessed absolutely based on the named register. The <vertexResultRegName> rule corresponds to specifically-named registers.

Vertex Program Instruction Set Operations

The operation of the 17 vertex program instructions will now be described. After the textual description of each instruction's operation, a register transfer level description is also presented.

The following conventions are used in each instruction's register transfer level description. The 4-component vector variables "t", "u", and "v" are assigned intermediate results. The destination register is called "destination". The three possible source registers are called "source0", "source1", and "source2" respectively.

The x, y, z, and w vector components are referred to with the suffixes ".x", ".y", ".z", and ".w" respectively. The suffix ".c" is used for scalar source register values and c represents the particular source register's selected scalar component. Swizzling of components is indicated with the suffixes ".c***", ".*c", ".c*", and ".***c" where c is meant to indicate the x, y, z, or w component selected for the particular source operand swizzle configuration. For example:

t.x=source0.c***;

t.y=source0.*c**;

t.z=source0.**c*;

t.w=source0.***c;

This example indicates that t may be assigned the swizzled version of the source0 operand based on the source0 operand's swizzle configuration.

The variables "negate0", "negate1", and "negate2" are booleans that are true when the respective source value may be negated. The variables "xmask", "ymask", "zmask", and "wmask" are booleans that are true when the destination write mask for the respective component is enabled for writing.

Otherwise, the register transfer level descriptions mimic ANSI C syntax.

The idiom "IEEE(expression)" represents the s23e8 single-precision result of the expression if evaluated using IEEE single-precision floating point operations. The IEEE idiom is used to specify the maximum allowed deviation from IEEE single-precision floating-point arithmetic results.

The following abbreviations are also used:

+Inf floating-point representation of positive infinity

−Inf floating-point representation of negative infinity

+NaN floating-point representation of positive not a number

−NaN floating-point representation of negative not a number

NA not applicable or not used

ARL: Address Register Load

The ARL instruction moves value of the source scalar into the address register. Conceptually, the address register load instruction is a 4-component vector signed integer register, but the only valid address register component for writing and indexing is the x component. The only use for A0.x is as a base address for program parameter reads. The source value is a float that is truncated towards negative infinity into a signed integer.

An example of use is shown in Table 2I.

TABLE 2I t.x = source0.c;
if (negate0) t.x = −t.x;
A0.x = floor(t.x);

MOV: Move

The MOV instruction moves the value of the source vector into the destination register.

An example of use is shown in Table 2J.

TABLE 2J

```
t.x = source0.c***;
t.y = source0.*c**;
t.z = source0.**c*;
t.w = source0.***c;
if (negate0) {
  t.x = -t.x;
  t.y = -t.y;
  t.z = -t.z;
  t.w = -t.w;
}
if (xmask) destination.x = t.x;
if (ymask) destination.y = t.y;
if (zmask) destination.z = t.z;
if (wmask) destination.w = t.w;
```

MUL: Multiply

The MUL instruction multiplies the values of the two source vectors into the destination register.

An example of use is shown in Table 2K.

TABLE 2K

```
t.x = source0.c***;
t.y = source0.*c**;
t.z = source0.**c*;
t.w = source0.***c;
if (negate0) {
  t.x = -t.x;
  t.y = -t.y;
  t.z = -t.z;
  t.w = -t.w;
}
u.x = source1.c***;
u.y = source1.*c**;
u.z = source1.**c*;
u.w = source1.***c;
if (negate1) {
  u.x = -u.x;
  u.y = -u.y;
  u.z = -u.z;
  u.w = -u.w;
}
if (xmask) destination.x = t.x * u.x;
if (ymask) destination.y = t.y * u.y;
if (zmask) destination.z = t.z * u.z;
if (wmask) destination.w = t.w * u.w;
```

ADD: Add

The ADD instruction adds the values of the two source vectors into the destination register.

An example of use is shown in Table 2L.

TABLE 2L

```
t.x = source0.c***;
t.y = source0.*c**;
t.z = source0.**c*;
t.w = source0.***c;
if (negate0) {
  t.x = -t.x;
  t.y = -t.y;
  t.z = -t.z;
  t.w = -t.w;
}
u.x = source1.c***;
u.y = source1.*c**;
u.z = source1.**c*;
u.w = source1.***c;
if (negate1) {
  u.x = -u.x;
  u.y = -u.y;
  u.z = -u.z;
  u.w = -u.w;
```

TABLE 2L-continued

```
}
if (xmask) destination.x = t.x + u.x;
if (ymask) destination.y = t.y + u.y;
if (zmask) destination.z = t.z + u.z;
if (wmask) destination.w = t.w + u.w;
```

MAD: Multiply and Add

The MAD instruction adds the value of the third source vector to the product of the values of the first and second two source vectors, writing the result to the destination register.

An example of use is shown in Table 2M.

TABLE 2M

```
t.x = source0.c***;
t.y = source0.*c**;
t.z = source0.**c*;
t.w = source0.***c;
if (negate0) {
  t.x = -t.x;
  t.y = -t.y;
  t.z = -t.z;
  t.w = -t.w;
}
u.x = source1.c***;
u.y = source1.*c**;
u.z = source1.**c*;
u.w = source1.***c;
if (negate1) {
  u.x = -u.x;
  u.y = -u.y;
  u.z = -u.z;
  u.w = -u.w;
}
v.x = source2.c***;
v.y = source2.*c**;
v.z = source2.**c*;
v.w = source2.***c;
if (negate2) {
  v.x = -v.x;
  v.y = -v.y;
  v.z = -v.z;
  v.w = -v.w;
}
if (xmask) destination.x = t.x * u.x + v.x;
  if (ymask) destination.y = t.y * u.y + v.y;
if (zmask) destination.z = t.z * u.z + v.z;
if (wmask) destination.w = t.w * u.w + v.w;
```

RCP: Reciprocal

The RCP instruction inverts the value of the source scalar into the destination register. The reciprocal of exactly 1.0 may be exactly 1.0.

Additionally the reciprocal of negative infinity gives [−0.0, −0.0, −0.0, −0.0]; the reciprocal of negative zero gives [−Inf, −Inf, −Inf, −Inf]; the reciprocal of positive zero gives [+Inf, +Inf, +Inf, +Inf]; and the reciprocal of positive infinity gives [0.0, 0.0, 0.0, 0.0].

An example of use is shown in Table 2N.

TABLE 2N

```
t.x = source0.c;
if (negate0) {
  t.x = -t.x;
}
if (t.x == 1.0f) {
  u.x = 1.0f;
} else {
  u.x = 1.0f / t.x;
}
if (xmask) destination.x = u.x;
if (ymask) destination.y = u.x;
```

TABLE 2N-continued

```
if (zmask) destination.z = u.x;
if (wmask) destination.w = u.x;
where
| u.x - IEEE(1.0f/t.x) | < 1.0f/(2^22)
for 1.0f <= t.x <= 2.0f.
```

The intent of this precision requirement is that this amount of relative precision apply over all values of t.x.

RSQ: Reciprocal Square Root

The RSQ instruction assigns the inverse square root of the absolute value of the source scalar into the destination register.

Additionally, RSQ(0.0) gives [+Inf, +Inf, +Inf, +Inf]; and both RSQ(+Inf) and RSQ(-Inf) give [0.0, 0.0, 0.0, 0.0].

An example of use is shown in Table 2O.

TABLE 2O

```
t.x = source0.c;
if (negate0) {
t.x = -t.x;
}
u.x = 1.0f / sqrt(fabs(t.x));
if (xmask) destination.x = u.x;
if (ymask) destination.y = u.x;
if (zmask) destination.z = u.x;
if (wmask) destination.w = u.x;
where
| u.x - IEEE(1.0f/sqrt(fabs(t.x))) | < 1.0f/(2^22)
for 1.0f <= t.x <= 4.0f.
```

The intent of this precision requirement is that this amount of relative precision apply over all values of t.x.

DP3: Three-Component Dot Product

The DP3 instruction assigns the three-component dot product of the two source vectors into the destination register.

An example of use is shown in Table 2P.

TABLE 2P

```
t.x = source0.c***;
t.y = source0.*c**;
t.z = source0.**c*;
if (negate0) {
t.x = -t.x;
t.y = -t.y;
t.z = -t.z;
}
u.x = source1.c***;
u.y = source1.*c**;
u.z = source1.**c*;
if (negate1) {
u.x = -u.x;
u.y = -u.y;
u.z = -u.z;
}
v.x = t.x * u.x + t.y * u.y + t.z * u.z;
if (xmask) destination.x = v.x;
if (ymask) destination.y = v.x;
if (zmask) destination.z = v.x;
if (wmask) destination.w = v.x;
```

DP4: Four-Component Dot Product

The DP4 instruction assigns the four-component dot product of the two source vectors into the destination register.

An example of use is shown in Table 2Q.

TABLE 2Q

```
t.x = source0.c***;
t.y = source0.*c**;
t.z = source0.**c*;
t.w = source0.***c;
if (negate0) {
t.x = -t.x;
t.y = -t.y;
t.z = -t.z;
t.w = -t.w;
}
u.x = source1.c***;
u.y = source1.*c**;
u.z = source1.**c*;
u.w = source1.***c;
if (negate1) {
u.x = -u.x;
u.y = -u.y;
u.z = -u.z;
u.w = -u.w;
}
v.x = t.x * u.x + t.y * u.y + t.z * u.z + t.w * u.w;
if (xmask) destination.x = v.x;
if (ymask) destination.y = v.x;
if (zmask) destination.z = v.x;
if (wmask) destination.w = v.x;
```

DST: Distance Vector

The DST instructions calculates a distance vector for the values of two source vectors. The first vector is assumed to be [NA, d*d, d*d, NA] and the second source vector is assumed to be [NA, 1.0/d, NA, 1.0/d], where the value of a component labeled NA is undefined. The destination vector is then assigned [1,d,d*d,1.0/d].

An example of use is shown in Table 2R

TABLE 2R

```
t.y = source0.*c**;
t.z = source0.**c*;
if (negate0) {
t.y = -t.y;
t.z = -t.z;
}
u.y = source1.*c**;
u.w = source1.***c;
if (negate1) {
u.y = -u.y;
u.w = -u.w;
}
if (xmask) destination.x = 1.0;
if (ymask) destination.y = t.y*u.y;
if (zmask) destination.z = t.z;
if (wmask) destination.w = u.w;
```

MIN: Minimum

The MIN instruction assigns the component-wise minimum of the two source vectors into the destination register.

An example of use is shown in Table 2S.

TABLE 2S

```
t.x = source0.c***;
t.y = source0.*c**;
t.z = source0.**c*;
t.w = source0.***c;
if (negate0) {
t.x = -t.x;
t.y = -t.y;
t.z = -t.z;
t.w = -t.w;
}
u.x = source1.c***;
```

TABLE 2S-continued

```
    u.y = source1.*c**;
    u.z = source1.**c*;
    u.w = source1.***c;
    if (negate1) {
        u.x = -u.x;
        u.y = -u.y;
        u.z = -u.z;
        u.w = -u.w;
    }
    if (xmask) destination.x = (t.x < u.x) .
t.x : u.x;
    if (ymask) destination.y = (t.y < u.y) .
t.y : u.y;
    if (zmask) destination.z = (t.z < u.z) .
t.z : u.z;
    if (wmask) destination.w = (t.w < u.w) .
t.w : u.w;
```

MAX: Maximum

The MAX instruction assigns the component-wise maximum of the two source vectors into the destination register.
An example of use is shown in Table 2T.

TABLE 2T

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
if (negate1) {
    u.x = -u.x;
    u.y = -u.y;
    u.z = -u.z;
    u.w = -u.w;
}
if (xmask) destination.x = (t.x >= u.x) . t.x : u.x;
if (ymask) destination.y = (t.y >= u.y) . t.y : u.y;
if (zmask) destination.z = (t.z >= u.z) . t.z : u.z;
if (wmask) destination.w = (t.w >= u.w) . t.w : u.w;
```

SLT: Set On Less Than

The SLT instruction performs a component-wise assignment of either 1.0 or 0.0 into the destination register. 1.0 is assigned if the value of the first source vector is less than the value of the second source vector; otherwise, 0.0 is assigned.
An example of use is shown in Table 2U.

TABLE 2U

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
if (negate1) {
```

TABLE 2U-continued

```
    u.x = -u.x;
    u.y = -u.y;
    u.z = -u.z;
    u.w = -u.w;
}
if (xmask) destination.x = (t.x <= u.x) . 1.0 : 0.0;
if (ymask) destination.y = (t.y <= u.y) . 1.0 : 0.0;
if (zmask) destination.z = (t.z <= u.z) . 1.0 : 0.0;
if (wmask) destination.w = (t.w <= u.w) . 1.0 : 0.0;
```

SGE: Set On Greater or Equal Than

The SGE instruction performs a component-wise assignment of either 1.0 or 0.0 into the destination register. 1.0 is assigned if the value of the first source vector is greater than or equal the value of the second source vector, otherwise, 0.0 is assigned.
An example of use is shown in Table 2V.

TABLE 2V

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
if (negate1) {
    u.x = -u.x;
    u.y = -u.y;
    u.z = -u.z;
    u.w = -u.w;
}
if (xmask) destination.x = (t.x >= u.x) . 1.0 : 0.0;
if (ymask) destination.y = (t.y >= u.y) . 1.0 : 0.0;
if (zmask) destination.z = (t.z >= u.z) . 1.0 : 0.0;
if (wmask) destination.w = (t.w >= u.w) . 1.0 : 0.0;
```

EXP: Exponential Base 2

The EXP instruction generates an approximation of the exponential base 2 for the value of a source scalar. This approximation is assigned to the z component of the destination register. Additionally, the x and y components of the destination register are assigned values useful for determining a more accurate approximation. The exponential base 2 of the source scalar can be better approximated by destination.x*FUNC(destination.y) where FUNC is some user approximation (presumably implemented by subsequent instructions in the vertex program) to 2^destination.y where 0.0<=destination.y<1.0.

Additionally, EXP(-Inf) or if the exponential result underflows gives [0.0, 0.0, 0.0, 0.0]; and EXP(+Inf) or if the exponential result overflows gives [+Inf, 0.0, +Inf, 1.0].
An example of use is shown in Table 2W.

TABLE 2W

```
t.x = source0.c;
if (negate0) {
    t.x = -t.x;
}
q.x = 2 floor(t.x);
q.y = t.x - floor(t.x);
```

TABLE 2W-continued

```
    q.z = q.x * APPX(q.y);
    if (xmask) destination.x = q.x;
    if (ymask) destination.y = q.y;
    if (zmask) destination.z = q.z;
    if (wmask) destination.w = 1.0;
where APPX is an implementation dependent
approximation of exponential base 2 such that
    | exp(q.y*log(2.0))–APPX(q.y) | < 1/(2^11)
for all 0 <= q.y < 1.0.
```

The expression "2^floor(t.x)" may overflow to +Inf and underflow to zero.

LOG: Logarithm Base 2

The LOG instruction generates an approximation of the logarithm base 2 for the absolute value of a source scalar. This approximation is assigned to the z component of the destination register. Additionally, the x and y components of the destination register are assigned values useful for determining a more accurate approximation. The logarithm base 2 of the absolute value of the source scalar can be better approximated by destination.x+FUNC(destination.y) where FUNC is some user approximation (presumably implemented by subsequent instructions in the vertex program) of log2(destination.y) where 1.0<=destination.y<2.0.

Additionally, LOG(0.0) gives [–Inf, 1.0, –Inf, 1.0]; and both LOG(+Inf) and LOG(–Inf) give [+Inf, 1.0, +Inf, 1.0].

An example of use is shown in Table 2X.

TABLE 2X

```
t.x = source0.c;
if (negate0) {
    t.x = –t.x;
}
if (fabs(t.x) != 0.0f) {
    if (fabs(t.x) == +Inf) {
        q.x = +Inf;
        q.y = 1.0;
        q.z = +Inf;
    } else {
        q.x = Exponent(t.x);
        q.y = Mantissa(t.x);
        q.z = q.x + APPX(q.y);
    }
} else {
    q.x = –Inf;
    q.y = 1.0;
    q.z = –Inf;
}
if (xmask) destination.x = q.x;
if (ymask) destination.y = q.y;
if (zmask) destination.z = q.z;
if (wmask) destination.w = 1.0;
where APPX is an implementation dependent approximation
of logarithm base 2 such that
| log(q.y)/log(2.0) – APPX(q.y) | < 1/(2^11)
for all 1.0 <= q.y < 2.0.
```

The "Exponent(t.x)" function returns the unbiased exponent between—126 and 127. For example, "Exponent(1.0)" equals 0.0. (Note that the IEEE floating-point representation maintains the exponent as a biased value.) Larger or smaller exponents may generate +Inf or –Inf respectively. The "Mantissa(t.x)" function returns a value in the range [1.0f, 2.0). The intent of these functions is that fabs(t.x) is approximately "Mantissa(t.x)*2^Exponent(t.x)".

LIT: Light Coefficients

The LIT instruction is intended to compute ambient, diffuse, and specular lighting coefficients from a diffuse dot product, a specular dot product, and a specular power that is clamped to (–128,128) exclusive. The x component of the source vector is assumed to contain a diffuse dot product (unit normal vector dotted with a unit light vector). The y component of the source vector is assumed to contain a Blinn specular dot product (unit normal vector dotted with a unit half-angle vector). The w component is assumed to contain a specular power.

An implementation may support at least 8 fraction bits in the specular power. Note that because 0.0 times anything may be 0.0, taking any base to the power of 0.0 may yield 1.0.

An example of use is shown in Table 2Y.

TABLE 2Y

```
t.x = source0.c***;
t.y = source0.*c**;
t.w = source0.***c;
if (negate0) {
    t.x = –t.x;
    t.y = –t.y;
    t.w = –t.w;
}
if (t.w < –(128.0–epsilon)) t.w = –(128.0–epsilon);
else if (t.w >128–epsilon) t.w = 128–epsilon;
if (t.x < 0.0) t.x = 0.0;
if (t.y < 0.0) t.y = 0.0;
if (xmask) destination.x = 1.0;
if (ymask) destination.y = t.x;
if (zmask) destination.z = (t.x > 0.0) .
EXP(t.w*LOG(t.y)) : 0.0;
if (wmask) destination.w = 1.0;
``` where EXP and LOG are functions that approximate the exponential base 2 and logarithm base 2 with the identical accuracy and special case requirements of the EXP and LOG instructions. epsilon is 1.0/256.0 or approximately 0.0039 which may correspond to representing the specular power with a s8.8 representation.

Vertex Program Floating Point Requirements

All vertex program calculations are assumed to use IEEE single precision floating-point math with a format of s1e8m23 (one signed bit, 8 bits of exponent, 23 bits of magnitude) or better and the round-to-zero rounding mode. The only exceptions to this are the RCP, RSQ, LOG, EXP, and LIT instructions.

It should be noted that (positive or negative) 0.0 times anything is (positive) 0.0.

The RCP and RSQ instructions deliver results accurate to $1.0/(2^{22})$ and the approximate output (the z component) of the EXP and LOG instructions only has to be accurate to $1.0/(2^{11})$. The LIT instruction specular output (the z component) is allowed an error equivalent to the combination of the EXP and LOG combination to implement a power function.

The floor operations used by the ARL and EXP instructions may operate identically. Specifically, the EXP instruction's floor(t.x) intermediate result may exactly match the integer stored in the address register by the ARL instruction.

Since distance is calculated as $(d^2)*(1/\mathrm{sqrt}(d^2))$, 0.0 multiplied by anything may be 0.0. This affects the MUL, MAD, DP3, DP4, DST, and LIT instructions.

Because if/then/else conditional evaluation is done by multiplying by 1.0 or 0.0 and adding, the floating point computations require the following shown in Table 2Z.

TABLE 2Z

| | |
|---|---|
| 0.0 * x = 0.0 | for all x (including +Inf, –Inf, +NaN, and –NaN) |
| 1.0 * x = x | for all x (including +Inf and –Inf) |
| 0.0 + x = x | for all x (including +Inf and –Inf) |

Including +Inf, –Inf, +NaN, and –NaN when applying the above three rules is recommended but not required. (The recommended inclusion of +Inf, −Inf, +NaN, and −NaN when applying the first rule is inconsistent with IEEE floating-point requirements.)

No floating-point exceptions or interrupts are generated. Denorms are not supported; if a denorm is input, it is treated as 0.0 (ie, denorms are flushed to zero).

Computations involving +NaN or −NaN generate +NaN, except for the requirement that zero times +NaN or −NaN may always be zero. (This exception is inconsistent with IEEE floating-point requirements).

Vertex Program Update for the Current Raster Position

When vertex programs are enabled, the raster position is determined by the current vertex program. The raster position specified by RasterPos is treated as if they were specified in a Vertex command. The contents of vertex result register set is used to update respective raster position state.

Assuming an existent program, the homogeneous clip-space coordinates are passed to clipping as if they represented a point and assuming no client-defined clip planes are enabled. If the point is not culled, then the projection to window coordinates is computed and saved as the current raster position and the valid bit is set. If the current vertex program is nonexistent or the "point" is culled, the current raster position and its associated data become indeterminate and the raster position valid bit is cleared.

Vertex Arrays for Vertex Attributes

Data for vertex attributes in vertex program mode may be specified using vertex array commands. The client may specify and enable any of sixteen vertex attribute arrays.

The vertex attribute arrays are ignored when vertex program mode is disabled. When vertex program mode is enabled, vertex attribute arrays are used.

The command void VertexAttribPointerNV(uint index, int size, enum type, sizei stride, const void *pointer);

describes the locations and organizations of the sixteen vertex attribute arrays. Index specifies the particular vertex attribute to be described. Size indicates the number of values per vertex that are stored in the array; size may be one of 1, 2, 3, or 4. Type specifies the data type of the values stored in the array. Type may be one of SHORT, FLOAT, DOUBLE, or UNSIGNED_BYTE and these values correspond to the array types short, int, float, double, and ubyte respectively. The INVALID_OPERATION error is generated if type is UNSIGNED_BYTE and size is not 4. The INVALID_VALUE error is generated if index is greater than 15. The INVALID_VALUE error is generated if stride is negative.

The one, two, three, or four values in an array that correspond to a single vertex attribute comprise an array element. The values within each array element at stored sequentially in memory. If the stride is specified as zero, then array elements are stored sequentially as well. Otherwise points to the ith and (i+1)st elements of an array differ by stride basic machine units (typically unsigned bytes), the pointer to the (i+1)st element being greater. Pointer specifies the location in memory of the first value of the first element of the array being specified.

Vertex attribute arrays are enabled with the EnableClientState command and disabled with the DisableClientState command. The value of the argument to either command is VERTEX_ATTRIB_ARRAYi_NV where i is an integer between 0 and 15; specifying a value of i enables or disables the vertex attribute array with index i. The constants obey VERTEX_ATTRIB_ARRAYi_NV=VERTEX_ATTRIB_ARRAY0_NV+i.

When vertex program mode is enabled, the ArrayElement command operates in a specific manner. Likewise, any vertex array transfer commands that are defined in terms of ArrayElement (DrawArrays, DrawElements, and DrawRangeElements) assume the operation of ArrayElement described in this description when vertex program mode is enabled.

When vertex program mode is enabled, the ArrayElement command transfers the ith element of particular enabled vertex arrays as described below. For each enabled vertex attribute array, it is as though the corresponding command were called with a pointer to element i. For each vertex attribute, the corresponding command is VertexAttrib[size][type]v, where size is one of [1,2,3,4], and type is one of [s,f,d,ub], corresponding to the array types short, int, float, double, and ubyte respectively.

However, if a given vertex attribute array is disabled, but its corresponding aliased conventional per-vertex parameter's vertex array is enabled, then it is as though the corresponding command were called with a pointer to element i. In this case, the corresponding command is determined.

If the vertex attribute array 0 is enabled, it is as though VertexAttrib[size][type]v(0, . . . ) is executed last, after the executions of other corresponding commands. If the vertex attribute array 0 is disabled but the vertex array is enabled, it is as though Vertex[size][type]v is executed last, after the executions of other corresponding commands.

Vertex State Program

Vertex state programs share the same instruction set as and a similar execution model to vertex programs. While vertex program are executed implicitly when a vertex transformation is provoked, vertex state programs are executed explicitly, independently of any vertices. Vertex state programs can write program parameter registers, but may not write vertex result registers.

The purpose of a vertex state program is to update program parameter registers by means of an application-defined program. Typically, an application may load a set of program parameters and then execute a vertex state program that reads and updates the program parameter registers. For example, a vertex state program might normalize a set of unnormalized vectors previously loaded as program parameters. The expectation is that subsequently executed vertex programs may use the normalized program parameters.

Vertex state programs are loaded with the same LoadProgramNV command used to load vertex programs except that the target may be VERTEX_STATE_PROGRAM_NV when loading a vertex state program.

Vertex state programs may conform to a more limited grammar than the grammar for vertex programs. The vertex state program grammar for syntactically valid sequences is the same as grammar with modified rules. See Table 2AA.

TABLE 2AA

| | |
|---|---|
| <program> | ::= "! !VSP1.0" |
| <instructionSequence> "END" | |
| <dstReg> | ::= <absProgParamReg> |
| | | <temporaryReg> |
| <vertexAttribReg> | ::= "v" "[" "0" "]" |

A vertex state program fails to load if it does not write at least one program parameter register.

A vertex state program fails to load if it contains more than 128 instructions.

A vertex state program fails to load if any instruction sources more than one unique program parameter register.

A vertex state program fails to load if any instruction sources more than one unique vertex attribute register (this is necessarily true because only vertex attribute 0 is available in vertex state programs).

The error INVALID_OPERATION is generated if a vertex state program fails to load because it is not syntactically correct or for one of the other reasons listed above.

A successfully loaded vertex state program is parsed into a sequence of instructions. Each instruction is identified by its tokenized name.

Executing vertex state programs is legal only outside a Begin/End pair. A vertex state program may not read any vertex attribute register other than register zero. A vertex state program may not write any vertex result register.

The command

ExecuteProgramNV(enum target, uint id, const float *params);

executes the vertex state program named by id. The target may be VERTEX_STATE_PROGRAM_NV and the ID may be the name of program loaded with a target type of VERTEX_STATE_PROGRAM_NV. params points to an array of four floating-point values that are loaded into vertex attribute register zero (the only vertex attribute readable from a vertex state program).

The INVALID_OPERATION error is generated if the named program is nonexistent, is invalid, or the program is not a vertex state program. A vertex state program may not be valid for various reasons.

Required Vertex Program State

The state required for vertex programs consists of: a bit indicating whether or not program mode is enabled; a bit indicating whether or not two-sided color mode is enabled; a bit indicating whether or not program-specified point size mode is enabled;

- 96 4-component floating-point program parameter registers; 16 4-component vertex attribute registers (though this state is aliased with the current normal, primary color, secondary color, fog coordinate, weights, and texture coordinate sets);
- 24 sets of matrix tracking state for each set of four sequential program parameter registers, consisting of a n-valued integer indicated the tracked matrix or GL_NONE (where n is 5+the number of texture units supported+the number of tracking matrices supported) and a four-valued integer indicating the transformation of the tracked matrix; an unsigned integer naming the currently bound vertex program and the state may be maintained to indicate which integers are currently in use as program names.

Each existent program object consists of a target, a boolean indicating whether the program is resident, an array of type ubyte containing the program string, and the length of the program string array. Initially, no program objects exist.

Program mode, two-sided color mode, and program-specified point size mode are all initially disabled.

The initial state of all 96 program parameter registers is (0,0,0,0).

The initial state of the 16 vertex attribute registers is (0,0,0,1) except in cases where a vertex attribute register aliases to a conventional GL transform mode vertex parameter in which case the initial state is the initial state of the respective aliased conventional vertex parameter.

The initial state of the 24 sets of matrix tracking state is NONE for the tracked matrix and IDENTITY_NV for the transformation of the tracked matrix.

The initial currently bound program is zero.

The client state required to implement the 16 vertex attribute arrays consists of 16 boolean values, 16 memory pointers, 16 integer stride values, 16 symbolic constants representing array types, and 16 integers representing values per element. Initially, the boolean values are each disabled, the memory pointers are each null, the strides are each zero, the array types are each FLOAT, and the integers representing values per element are each four."

Points

When program vertex mode is disabled, the point size for rasterizing points is controlled with void PointSize(float size); size specifies the width or diameter of a point. The initial point size value is 1.0. A value less than or equal to zero results in the error INVALID_VALUE. When vertex program mode is enabled, the point size for rasterizing points is determined.

Color Sum

At the beginning of color sun, a fragment has two RGBA colors: a primary color cpri (which texturing, if enabled, may have modified) and a secondary color csec. If vertex program mode is disabled, csec is defined by the lighting equations. If vertex program mode is enabled, csec is the fragment's secondary color, obtained by interpolating the COL1 (or BFC1 if the primitive is a polygon, the vertex program two-sided color mode is enabled, and the polygon is back-facing) vertex result register RGB components for the vertices making up the primitive; the alpha component of csec when program mode is enabled is always zero. The components of these two colors are summed to produce a single post-texturing RGBA color c. The components of c are then clamped to the range [0,1].

Fog

The factor f may be computed according to one of three equations. See Table 2AB.

TABLE 2AB

| | |
|---|---|
| f = exp(−d*c) | (3.24) |
| f = exp(− (d*c)^2) | (3.25) |
| f = (e−c) / (e−s) | (3.26) |

If vertex program mode is enabled, then c is the fragment's fog coordinate, obtained by interpolating the FOGC vertex result register values for the vertices making up the primitive. When vertex program mode is disabled, the c is the eye-coordinate distance from the eye, (0,0,0,1) in eye-coordinates, to the fragment center."

Evaluators

Additional evaluators are shown in Table 2AC.

TABLE 2AC

| target | k | values |
|---|---|---|
| MAP1_VERTEX_ATTRIB0_4_NV | 4 | x, y, z, w vertex attribute 0 |
| MAP1_VERTEX_ATTRIB1_4_NV | 4 | x, y, z, w vertex attribute 1 |
| MAP1_VERTEX_ATTRIB2_4_NV | 4 | x, y, z, w vertex attribute 2 |
| MAP1_VERTEX_ATTRIB3_4_NV | 4 | x, y, z, w vertex attribute 3 |
| MAP1_VERTEX_ATTRIB4_4_NV | 4 | x, y, z, w vertex attribute 4 |
| MAP1_VERTEX_ATTRIB5_4_NV | 4 | x, y, z, w vertex attribute 5 |
| MAP1_VERTEX_ATTRIB6_4_NV | 4 | x, y, z, w vertex attribute 6 |
| MAP1_VERTEX_ATTRIB7_4_NV | 4 | x, y, z, w vertex attribute 7 |
| MAP1_VERTEX_ATTRIB8_4_NV | 4 | x, y, z, w vertex attribute 8 |
| MAP1_VERTEX_ATTRIB9_4_NV | 4 | x, y, z, w vertex attribute 9 |
| MAP1_VERTEX_ATTRIB10_4_NV | 4 | x, y, z, w vertex attribute 10 |
| MAP1_VERTEX_ATTRIB11_4_NV | 4 | x, y, z, w vertex attribute 11 |

TABLE 2AC-continued

| target | k | values |
|---|---|---|
| MAP1_VERTEX_ATTRIB12_4_NV | 4 | x, y, z, w vertex attribute 12 |
| MAP1_VERTEX_ATTRIB13_4_NV | 4 | x, y, z, w vertex attribute 13 |
| MAP1_VERTEX_ATTRIB14_4_NV | 4 | x, y, z, w vertex attribute 14 |
| MAP1_VERTEX_ATTRIB15_4_NV | 4 | x, y, z, w vertex attribute 15 |

EvalCoord operates differently depending on whether vertex program mode is enabled or not. It is first described how EvalCoord operates when vertex program mode is disabled.

When one of the EvalCoord commands is issued and vertex program mode is disabled, all currently enabled maps (excluding the maps that correspond to vertex attributes, i.e. maps of the form MAPx_VERTEX_ATTRIBn_4_NV).

When one of the EvalCoord commands is issued and vertex program mode is enabled, the evaluation and the issuing of per-vertex parameter commands matches the discussion above, except that if any vertex attribute maps are enabled, the corresponding VertexAttribNV call for each enabled vertex attribute map is issued with the map's evaluated coordinates and the corresponding aliased per-vertex parameter map is ignored if it is also enabled, with one important difference. As is the case when vertex program mode is disabled, the GL uses evaluated values instead of current values for those evaluations that are enabled (otherwise the current values are used). The order of the effective commands is immaterial, except that Vertex or VertexAttribNV(0, . . . ) (the commands that issue provoke vertex program execution) may be issued last. Use of evaluators has no effect on the current vertex attributes or conventional per-vertex parameters. If a vertex attribute map is disabled, but its corresponding conventional per-vertex parameter map is enabled, the conventional per-vertex parameter map is evaluated and issued as when vertex program mode is not enabled."

AUTO_NORMAL

Finally, if either MAP2_VERTEX_3 or MAP2_VERTEX_4 is enabled or if both MAP2_VERTEX_ATTRIB0_4_NV and vertex program mode are enabled, then the normal to the surface is computed. Analytic computation, which sometimes yields normals of length zero, is one method which may be used. If automatic normal generation is enabled, then this computed normal is used as the normal associated with a generated vertex (when program mode is disabled) or as vertex attribute 2 (when vertex program mode is enabled). Automatic normal generation is controlled with Enable and Disable with the symbolic constant AUTO_NORMAL.

If automatic normal generation is disabled and vertex program mode is enabled, then vertex attribute 2 is evaluated as usual. If automatic normal generation and vertex program mode are disabled, then a corresponding normal map, if enabled, is used to produce a normal. If neither automatic normal generation nor a map corresponding to the normal per-vertex parameter (or vertex attribute 2 in program mode) are enabled, then no normal is sent with a vertex resulting from an evaluation (the effect is that the current normal is used). For MAP_VERTEX3, let q=p. For MAP_VERTEX_4 or MAP2_VERTEX_ATTRBI0_4_NV, let q=(x/w, y/w, z/w) where (x,y,z,w)=p. Then let m=(partial q/partial u) cross (partial q/partial v).

Then when vertex program mode is disabled, the generated analytic normal, n, is given by n−∥m∥. However, when vertex program mode is enabled, the generated analytic normal used for vertex attribute 2 is simply (mx,my,mz,1). In vertex program mode, the normalization of the generated analytic normal can be performed by the current vertex program.

The state required for evaluators potentially consists of 9 conventional one-dimensional map specifications, 16 vertex attribute one-dimensional map specifications, 9 conventional two-dimensional map specifications, and 16 vertex attribute two-dimensional map specifications indicating which are enabled. . . . All vertex coordinate maps produce the coordinates (0,0,0,1) (or the appropriate subset); all normal coordinate maps produce (0,0,1); RGBA maps produce (1,1,1,1); color index maps produce 1.0; texture coordinate maps produce (0,0,0,1); and vertex attribute maps produce (0,0,0,1) . . . If any evaluation command is issued when none of MAPn_VERTEX_3, MAPn_VERTEX_4, or MAPn_VERTEX_ATTRIB0_NV (where n is the map dimension being evaluated) are enabled, nothing happens."

Display Lists

Commands not compiled into display lists include AreProgramsResidentNV, IsProgramNV, GenProgramsNV, DeleteProgramsNV, VertexAttribPointerNV.

Saving and Restoring State

Only the enables and vertex array state introduced by the present extension can be pushed and popped.

Vertex Program Queries

The commands void GetProgramParameterfvNV(enum target, uint index, enum pname, float *params);

void GetProgramParameterdvNV(enum target, uint index, enum pname, double *params);

obtain the current program parameters for the given program target and parameter index into the array params. target may be VERTEX_PROGRAM_NV. pname may be PROGRAM_PARAMETER_NV.

The INVALID_VALUE error is generated if index is greater than 95. Each program parameter is an array of four values.

The command void GetProgramivNV(uint id, enum pname, int *params); obtains program state named by pname for the program named ID in the array params. pname may be one of PROGRAM_TARGET_NV, PROGRAM_LENGTH_NV, or PROGRAM_RESIDENT_NV. The INVALID_OPERATION error is generated if the program named ID does not exist.

The command void GetProgramStringNV(uint id, enum pname, ubyte *program); obtains the program string for program id. pname may be PROGRAM_STRING_NV. n ubytes are returned into the array program where n is the length of the program in ubytes. GetProgramivNV with PROGRAM_LENGTH_NV can be used to query the length of a program's string. The INVALID_OPERATION error is generated if the program named ID does not exist.

The command void GetTrackMatrixivNV(enum target, uint address, enum pname, int *params); obtains the matrix tracking state named by pname for the specified address in the array params. target may be VERTEX_PROGRAM_NV. pname may be either TRACK_MATRIX_NV or TRACK_MATRIX_TRANSFORM_NV. The INVALID_VALUE error is generated if address is not divisible by four and is not less than 96.

The commands void GetVertexAttribdvNV(uint index, enum pname, double *params); void GetVertexAttribfvNV (uint index, enum pname, float *params); void GetVertexAttribivNV(uint index, enum pname, int *params); obtain the vertex attribute state named by pname for the vertex attribute numbered index. pname may be one of ATTRIB_ARRAY_SIZE_NV, ATTRIB_ARRAY_STRIDE_NV, ATTRIB_ARRAY_TYPE_NV, or CURRENT_ATTRIB_NV. Note that all the queries except CURRENT_ATTRIB_NV return client state. The NVALID_VALUE error is generated if index greater than 15 or equal to zero.

The command void GetVertexAttribPointervNV(uint index, enum pname, void **pointer); obtains the pointer named pname in the array params for vertex attribute numbered index. pname may be ATTRIB_ARRAY_POINTER_NV. The INVALID_VALUE error is generated if index greater than 15.

The command boolean IsProgramNV(uint id); returns TRUE if program is the name of a program object. If program is zero or is a non-zero value that is not the name of a program object, or if an error condition occurs, IsProgramNV returns FALSE. A name returned by GenProgramsNV but not yet loaded with a program is not the name of a program object."

Querying Current Matrix State

Instead of providing distinct symbolic tokens for querying each matrix and matrix stack depth, the symbolic tokens CURRENT_MATRIX_NV and CURRENT_MATRIX_STACK_DEPTH_NV in conjunction with the GetBooleanv, GetIntegerv, GetFloatv, and GetDoublev return the respective state of the current matrix given the current matrix mode.

Querying CURRENT_MATRIX_NV and CURRENT_MATRIX_STACK_DEPTH_NV is the only means for querying the matrix and matrix stack depth of the tracking matrices.

Additional Rules

Rule X Vertex program and vertex state program instructions not relevant to the calculation of any result may have no effect on that result.

Rules X+1 Vertex program and vertex state program instructions relevant to the calculation of any result may always produce the identical result. In particular, the same instruction with the same source inputs may produce the identical result whether executed by a vertex program or a vertex state program.

Instructions relevant to the calculation of a result are any instructions in a sequence of instructions that eventually determine the source values for the calculation under consideration.

There is no guaranteed invariance between vertices transformed by conventional GL vertex transform mode and vertices transformed by vertex program mode. Multi-pass rendering algorithms that require rendering invariances to operate correctly may not mix conventional GL vertex transform mode with vertex program mode for different rendering passes. However such algorithms may operate correctly if the algorithms limit themselves to a single mode of vertex transformation."

Additions to the AGL/GLX/WGL Specifications

Program objects are shared between AGL/GLX/WGL rendering contexts if and only if the rendering contexts share display lists. No change is made to the AGL/GLX/WGL API.

Dependencies on EXT_vertex_weighting If the EXT_vertex_weighting extension is not supported, there is no aliasing between vertex attribute 1 and the current vertex weight.

Dependencies on EXT_point_parameters

When EXT_point_parameters is supported, the amended discussion of point size determination may be further amended with the language from the EXT_point_parameters specification though the point parameters functionality only applies when vertex program mode is disabled.

Even if the EXT_point_parameters extension is not supported, the PSIZ vertex result register may operate as specified.

Dependencies on ARB_multitexture

ARB_multitexture is required to support NV_vertex_program and the value of MAX_TEXTURE_UNITS_ARB may be at least 2. If more than 8 texture units are supported, only the first 8 texture units can be assigned texture coordinates when vertex program mode is enabled. Texture units beyond 8 are implicitly disabled when vertex program mode is enabled.

Dependencies on EXT_fog_coord If the EXT_fog_coord extension is not supported, there is no aliasing between vertex attribute 5 and the current fog coordinate.

Even if the EXT_fog_coord extension is not supported, the FOGC vertex result register may operate as specified. Note that the FOGC vertex result register behaves identically to the EXT_fog_coord extension's FOG_COORDINATE_SOURCE_EXT being FOG_COORDINATE_EXT. This means that the functionality of EXT_fog_coord is required to implement NV_vertex_program even if the EXT_fog_coord extension is not supported.

If the EXT_fog_coord extension is supported, the state of FOG_COORDINATE_SOURCE_EXT only applies when vertex program mode is disabled.

Dependencies on EXT_secondary_color

If the EXT_secondary_color extension is not supported, there is no aliasing between vertex attribute 4 and the current secondary color.

Even if the EXT_secondary_color extension is not supported, the COL1 and BFC1 vertex result registers may operate as specified. These vertex result registers are required to implement OpenGL® 1.2's separate specular mode within a vertex program.

GLX Protocol

Appendix A illustrates a plurality of GL commands associated with the present extension.

Errors

Appendix B illustrates a plurality of errors associated with the present extension.

Implementation Issues

Various implementation issues will now be addressed.

OpenGL® Components Bypassed by Vertex Programs

Table 2AD illustrates a list of various components of OpenGL® that may optionally be bypassed by vertex programs.

TABLE 2AD

Vertex programs bypass the following OpenGL ® functionality:

Normal transformation and normalization
Per-vertex lighting
Color material
Texture coordinate generation
The texture matrix
The normalization of AUTO_NORMAL evaluated normals
The modelview and projection matrix transforms
The per-vertex processing in EXT_point_parameters
The per-vertex processing in NV_fog_distance TABLE 2AD-continued Vertex programs bypass the following OpenGL ® functionality:
Raster position transformation
Client-defined clip planes
Operations not subsumed by vertex programs
The view frustum clip
Perspective divide (division by w)
The viewport transformation
The depth range transformation
Clamping the primary and secondary color to [0, 1]
Primitive assembly and subsequent operations
Evaluator (except the AUTO_NORMAL normalization)

Precision Requirements

The present extension defines an instruction set and its corresponding execution environment. The instruction set specified may find applications beyond the traditional purposes of 3D vertex transformation, lighting, and texture coordinate generation that have fairly lax precision requirements. To facilitate such possibly unexpected applications of this functionality, minimum precision requirements are specified.

The minimum precision requirements in the present description are meant to serve as a baseline so that application developers can write vertex programs with minimal complications about precision issues.

Situations where the "Execution Environment" Involves Support for Other Extensions The present extension assumes support for functionality that includes a fog distance, secondary color, point parameters, and multiple texture coordinates.

There is a trade-off between requiring support for these extensions to guarantee a particular extended execution environment and requiring lots of functionality that everyone might not support.

Application developers may desire a high baseline of functionality so that OpenGL® applications using vertex programs can work in the full context of OpenGL®. But if too much is required, the implementation burden mandated by the extension may limit the number of available implementations.

Support for 8 texture units is not necessarily recommended even if the machinery is there for it. Still multitexture is a common and important feature for using vertex programs effectively. In one embodiment, at least two texture units are required.

Alpha Component of the Secondary Color

When vertex program mode is enabled, the alpha component of csec used for the color sum state is assumed always zero. Another downstream extension may make the alpha component written into the COL1 (or BFC1) vertex result register available.

Client-Defined Clip, Planes

Client-defined clip planes may not be enabled when a vertex program is enabled. Client-defined clip planes of OpenGL® are specified in eye-space. Vertex programs generate homogeneous clip space positions. Unlike the conventional OpenGL® vertex transformation mode, vertex program mode requires no semantic equivalent to eye-space.

Applications that require client-defined clip planes can simulate OpenGL®-style client-defined clip planes by generating texture coordinates and using alpha testing or other per-fragment tests such as the CULL_FRAGMENT_NV program of NV_texture_shader to discard fragments. In many ways, such schemes provide a more flexible mechanism for clipping than client-defined clip planes.

Unfortunately, vertex programs used in conjunction with selection or feedback may not have a means to support client-defined clip planes because the per-fragment culling mechanisms described in the previous paragraph are not available in the selection or feedback render modes.

Finally, as a practical concern, client-defined clip planes greatly complicate clipping for various hardware rasterization architectures.

Edge Flags

Edge flags are passed through without the ability to be modified by a vertex program. Applications are free to send edge flags when vertex program mode is enabled.

Vertex Attribute Arrays Interaction with Conventional Vertex Arrays

When vertex program mode is enabled, a particular vertex attribute array may be used if enabled, but if disabled, and the corresponding aliased conventional vertex array is enabled (assuming that there is a corresponding aliased conventional vertex array for the particular vertex array), the conventional vertex array may be used.

This matches the way immediate mode per-vertex parameter aliasing works.

This may slightly complicate vertex array validation in program mode, but programmers using vertex arrays can simply enable vertex program mode without reconfiguring conventional vertex arrays and get what is expected.

It should be noted that this creates an asymmetry between immediate mode and vertex arrays depending on whether vertex program mode is enabled or not. The immediate mode vertex attribute commands operate unchanged whether vertex program mode is enabled or not. However, the vertex attribute vertex arrays are used only when vertex program mode is enabled.

Supporting vertex attribute vertex arrays when vertex program mode is disabled may create a large implementation burden for existing OpenGL® implementations that have heavily optimized conventional vertex arrays. For example, the normal array can be assumed to always contain 3 and only 3 components in conventional OpenGL® vertex transform mode, but may contain 1, 2, 3, or 4 components in vertex program mode.

There is not necessarily any additional functionality gained by supporting vertex attribute arrays when vertex program mode is disabled, but there is considerable implementation overhead. In any case, it may not be supported in one embodiment. In such case, vertex attribute arrays may be ignored when vertex program mode is not enabled.

Ignoring VertexAttribute commands or treating VertexAttribute commands as an error when vertex program mode is enabled may likely add overhead for such a conditional check. The implementation overhead for supporting VertexAttribute commands when vertex program mode is disabled is not that significant. Additionally, it is likely that setting persistent vertex attribute state while vertex program mode is disabled may be useful to applications. As such, vertex attribute immediate mode commands are permitted when vertex program mode is not enabled.

Vertex Program Ramifications

Colors and normals specified as ints, uints, shorts, ushorts, bytes, and ubytes are converted to floating-point ranges when supplied to core OpenGL®. Other per-vertex attributes such as texture coordinates and positions are not converted. This has ramifications with vertex programs where all vertex attributes are supposedly treated identically.

Vertex attributes specified as bytes and ubytes are always converted. All other formats are not necessarily converted, but simply converted directly to floating-point. The ubyte type is converted because those types seem more useful for passing colors in the [0,1] range. If an application desires a conversion, the conversion can be incorporated into the vertex program itself.

This principle also applies to vertex attribute arrays. However, by enabling a color or normal vertex array and not enabling the corresponding aliased vertex attribute array, programmers can get the conventional conversions for color and normal arrays (but only for the vertex attribute arrays that alias to the conventional color and normal arrays and only with the sizes/types supported by these color and normal arrays).

C-style Null-terminated Strings

Programs should not necessarily be C-style null-terminated strings. Programs may be specified as an array of GLubyte with an explicit length parameter. OpenGL® has no precedent for passing null-terminated strings into the API (though glGetString returns null-terminated strings). Null-terminated strings are problematic for some languages.

Existing OpenGL® Transform Functionality and Extensions

All existing OpenGL® transform functionality and extensions may be implementable as vertex programs. Vertex programs may be a complete superset of what one can do with OpenGL® 1.2 and existing vertex transform extensions.

To implement EXT_point_parameters, a GL_VERTEX_PROGRAM_POINT_SIZE_NV enable is introduced.

To implement two-sided lighting, a GL_VERTEX_PROGRAM_TWO_SIDE_NV enable is introduced.

GlPointSize in Vertex Programs

GlPointSize works in a specific manner with vertex programs. If GL_VERTEX_PROGRAM_POINT_SIZE_NV is disabled, the size of points is determine by the glPointSize state. If enabled, the point size is determined per-vertex by the clamped value of the vertex result PSIZ register.

Currently Bound Vertex Program ID

The currently bound vertex program ID can be deleted or reloaded. When a vertex program ID is deleted or reloaded when it is the currently bound vertex program, it is as if a rebind occurs after the deletion or reload.

In the case of a reload, the new vertex program may be used from then on. In the case of a deletion, the current vertex program may be treated as if it is nonexistent.

Managing Program Residency with Program Objects

Program objects may have a mechanism for managing program residency. Vertex program instruction memory is a limited hardware resource. glBindProgramNV may be faster if binding to a resident program. Applications are likely to want to quickly switch between a small collection of programs.

glAreProgramsResidentNV allows the residency status of a group of programs to be queried. This mimics glAreTexturesResident.

Instead of adopting the giPrioritizeTextures mechanism, a new glRequestResidentProgramsNV command is specified instead.

Assigning priorities to textures has always been a problematic endeavor and few OpenGL® implementations implemented it effectively. For the priority mechanism to work well, it requires the client to routinely update the priorities of textures.

The glRequestResidentProgramsNV indicates to the GL that a set of programs are intended for use together. Because all the programs are requesting residency as a group, drivers may be able to attempt to load all the requested programs at once (and remove from residency programs not in the group if necessary). Clients can use glAreProgramsResidentNV to query the relative success of the request.

glRequestResidentProgramsNV may be superior to loading programs on-demand because fragmentation can be avoided.

Execute a Nonexistent or Invalid Program

When one executes a nonexistent or invalid program, glBegin may fail with a GL_INVALID_OPERATION if the currently bound vertex program is nonexistent or invalid. The same applies to glRasterPos and any command that implies a glBegin. Because the glVertex and glVertexAttribNV(0, . . . ) are ignored outside of a glBegin/glEnd pair (without generating an error) it is impossible to provoke a vertex program if the current vertex program is nonexistent or invalid. Other per-vertex parameters (for examples those set by glColor, glNormal, and glVertexAttribNV when the attribute number is not zero) are recorded since they are legal outside of a glBegin/glEnd.

For vertex state programs, the problem is simpler because glExecuteProgramNV can immediately fail with a GL_INVALID_OPERATION when the named vertex state program is nonexistent or invalid.

Extending Evaluators

Evaluators may be extended to evaluate arbitrary vertex attributes. The present extension supports 32 new maps (16 for MAP1 and 16 for MAP2) that take priority over the conventional maps that they might alias to (only when vertex program mode is enabled).

These new maps always evaluate all four components. The rationale for this is that if 1, 2, 3, or 4 components were supported, that may add 128 (16*4*2) enumerates which is too many. In addition, if one wanted to evaluate two 2-component vertex attributes, one could instead generate one 4-component vertex attribute and use the vertex program with swizzling to treat this as two-components.

Moreover, 4-component vector instructions are assumed so less than 4-component evaluations might not be any more efficient than 4-component evaluations. Implementations that use vector instructions such as Intel's SSE instructions may be easier to implement since they can focus on optimizing just the 4-component case.

GL_AUTO_NORMAL

GL_AUTO_NORMAL works with vertex programs in a specific manner. GL_AUTO_NORMAL may NOT guarantee that the generated analytical normal be normalized. In vertex program mode, the current vertex program can easily normalize the normal if required.

This can lead to greater efficiency if the vertex program transforms the normal to another coordinate system such as eye-space with a transform that preserves vector length. Then, a single normalize after transform is more efficient than normalizing after evaluation and also normalizing after transform.

Conceptually, the normalize mandated for AUTO_NORMAL is just one of the many transformation operations subsumed by vertex programs.

GL_ENABLE_BIT

The new vertex program may enable push/pop with GL_ENABLE_BIT. Pushing and popping enable bits is easy. This includes the 32 new evaluator map enable bits. These evaluator enable bits are also pushed and popped using GL_EVAL_BIT.

GL_CURRENT_BIT

All the vertex attribute states may push/pop with GL_CURRENT_BIT. The state is aliased with the conventional per-vertex parameter state so it really may push/pop.

GL_CLIENT_VERTEX_ARRAY_BIT

All the vertex attrib vertex array state may push/pop with GL_CLIENT_VERTEX_ARRAY_BIT. Other vertex program-related state may not necessarily push/pop, however.

The other vertex program doesn't fit well with the existing bits. To be clear, GL_ALL_ATTRIB_BITS does not push/pop vertex program state other than enables.

GL_INVALID_OPERATION

A GL_INVALID_OPERATION operation may be generated if updating a vertex attribute greater than 15. The other option may be to mask or modulo the vertex attribute index with 16. This is reasonable, but it may make it difficult to increase the number of vertex attributes in the future.

If a check is made for the error, it may be a well predicted branch for immediate mode calls. For vertex arrays, the check may only be required at vertex array specification time. This may encourage people to use vertex arrays over immediate mode.

Support for Writes to Program Parameter Registers

Program parameter registers may not necessarily be written during a vertex program be supported. Writes to program parameter registers from within a vertex program may require the execution of vertex programs to be serialized with respect to each other. This may create an unwarranted implementation penalty for parallel vertex program execution implementations.

However, vertex state programs may write to program parameter registers.

Support for Immediate Mode Byte and Ubyte Commands

Variously sized immediate mode byte and ubyte commands may be supported. With respect to vertex arrays, the 4ub mode may only be supported.

There are simply too many glVertexAttribNV routines. Passing less than 4 bytes at a time is inefficient. The main use for bytes is expected to be for colors where these may be unsigned bytes. As such, 4ub mode for bytes is supported. This may also apply to vertex arrays.

Support for Integer, Unsigned Integer, and Unsigned Short Formats

Integer, unsigned integer, and unsigned short formats may not necessarily be supported for vertex attributes. Such would require to many immediate mode entry points, most of which are not that useful. Signed shorts may be supported, however. Signed shorts may be useful for passing compact texture coordinates.

Support for Doubles for Vertex Attributes

Doubles may be supported for vertex attributes. Some implementation of the extension might support double precision. A lot of math routines output double precision.

Determining a Location of a First Parse Error

One may query PROGRAM_ERROR_POSITION_NV to determine where in a loaded program string the first parse error occurs.

Sharing Program Objects

Program objects may be shared among rendering contexts in the same manner as display lists and texture objects.

Interaction with Color Material

The present extension interact may not necessarily interact with color material. Color material is a conventional OpenGL® vertex transform mode. It does not necessarily have a place for vertex programs. If one wants to emulate color material with vertex programs, he or she may simply write a program where the material parameters feed from the color vertex attribute.

GlMatrixMode and glActiveTextureARB Style Selector

There may not necessarily be a glMatrixMode or glActiveTextureARB style selector for vertex attributes. While this may let one reduce a lot of enumerates down, it may make programming a hassle in lots of cases. Consider having to change the vertex attribute mode to enable a set of vertex arrays.

Vertex Attribute Array Pointers

Vertex attribute array pointers may be obtained by adding new get commands. Using the existing calls may require adding 4 sets of 16 enumerates stride, type, size, and pointer. This results in too many "gets." Instead, one may add glGetVertexAttribNV and glGetVertexAttribPointerNV. glGetVertexAttribNV is also useful for querying the current vertex attribute.

glGet and glGetPointerv may not return vertex attribute array pointers.

Address Register Numbering

The address register is numbered and includes a vector register for improvement purposes. In one embodiment, A0.y and A0.z and A0.w may exist. For the present extension, A0.x is useful. In another embodiment, there may be more than one address register.

A favorable consistency is provided when considering all the registers as 4-component vectors even if the address register has only one usable component.

Header/End Token

Vertex programs and vertex state programs may be required to have a header token and an end token. The "!!VP1.0" and "!!VSP1.0" tokens start vertex programs and vertex state programs respectively. Both types of programs may end with the "END" token.

The initial header token reminds the programmer what type of program being written. If vertex programs and vertex state programs are ever read from disk files, the header token can serve as a magic number for identifying vertex programs and vertex state programs.

The target type for vertex programs and vertex state programs can be distinguished based on their respective grammars independent of the initial header tokens, but the initial header tokens may make it easier for programmers to distinguish the two program target types.

One may expect programs to often be generated by concatenation of program fragments. The "END" token may reduce bugs due to specifying an incorrectly concatenated program.

These additional header and end tokens may be made optional, but if there is a sanity check value in header and end tokens, that value is undermined if the tokens are optional.

Rendering Invariances

The justification for the two rules cited is to support multi-pass rendering when using vertex programs. Different rendering passes may likely use different programs so there may be some means of guaranteeing that two different programs can generate particular identical vertex results between different passes.

In practice, this does limit the type of vertex program implementations that are possible.

For example, consider a limited hardware implementation of vertex programs that uses a different floating-point implementation than the CPU's floating-point implementation. If the limited hardware implementation can only run small vertex programs (say the hardware provides on 4 temporary registers instead of the required 12), the implementation is incorrect and non-conformant if programs that only require 4 temporary registers use the vertex program hardware, but programs that require more than 4 temporary registers are implemented by the CPU.

This may be a very important practical requirement. For example, a multi-pass rendering algorithm may be considered where one pass uses a vertex program that uses only 4 temporary registers, but a different pass uses a vertex program that uses 5 temporary registers. If two programs have instruction sequences that given the same input state compute identical resulting vertex positions, the multi-pass algorithm may generate identically positioned primitives for each pass. But given the non-conformant vertex program implementation described above, this could not be guaranteed.

This does not mean that schemes for splitting vertex program implementations between dedicated hardware and CPUs are impossible. If the CPU and dedicated vertex program hardware used IDENTICAL floating-point implementations and therefore generated exactly identical results, the above described could work.

While these invariance rules are vital for vertex programs operating correctly for multi-pass algorithms, there is no requirement that conventional OpenGL® vertex transform mode may be invariant with vertex program mode. A multi-pass algorithm may not assume that one pass using vertex program mode and another pass using conventional GL vertex transform mode may generate identically positioned primitives.

While the conventional OpenGL® vertex program mode is repeatable with itself, the exact procedure used to transform vertices is not specified nor is the procedure's precision specified. The GL specification indicates that vertex coordinates are transformed by the modelview matrix and then transformed by the projection matrix. Some implementations may perform this sequence of transformations exactly, but other implementations may transform vertex coordinates by the composite of the modelview and projection matrices (one matrix transform instead of two matrix transforms in sequence). Given this implementation flexibility, there is no way for a vertex program author to exactly duplicate the precise computations used by the conventional OpenGL® vertex transform mode.

The guidance to OpenGL® application programs is clear. If one implements multi-pass rendering algorithms that require certain invariances between the multiple passes, he or she may choose either vertex program mode or the conventional OpenGL® vertex transform mode for rendering passes, but do not mix the two modes.

Relative Addressing Offsets

Relative addressing offsets in the range of −64 to 63 may be allowed. Negative offsets are useful for accessing a table centered at zero without extra bias instructions. Having the offsets support much larger magnitudes appears to increase the required instruction widths. The −64 to 63 range may be a reasonable compromise.

GL_COLOR_SUM_EXT

The GL_COLOR_SUM_EXT enable has no affect when vertex program mode is enabled. When vertex program mode is enabled, the color sum operation is always in operation. A program can "avoid" the color sum operation by not writing the COL1 (or BFC1 when GL_VERTEX_PROGRAM_TWO_SIDE_NV) vertex result registers because the default values of all vertex result registers is (0,0,0,1). For the color sum operation, the alpha value is always assumed zero. So by not writing the secondary color vertex result registers, the program assures that zero is added as part of the color sum operation.

If there is a cost to the color sum operation, OpenGL® implementations may determine at program bind time whether a secondary color vertex result is generated and implicitly disable the color sum operation.

RCP of 1.0

RCP of 1.0 may always be 1.0. This is important for 3D graphics so that non-projective textures and orthogonal projections work as expected. Basically when q or w is 1.0, operation is maintained as expected.

Stronger requirements such as "RCP of −1.0 may always be −1.0" are encouraged, but there is no compelling reason to state such requirements explicitly as is the case for "RCP of 1.0 may always be 1.0".

Source Scalar Value for the ARL Instruction

When the source scalar value for the ARL instruction is an extremely positive or extremely negative floating-point value, there is no problem mapping the value to a constrained integer range. Relative addressing can by offset by a limited range of offsets (−64 to 63). Relative addressing that falls outside of the 0 to 95 range of program parameter registers is automatically mapped to (0,0,0,0).

Clamping the source scalar value for ARL to the range −64 to 160 inclusive is sufficient to ensure that relative addressing is out of range.

Table 3 illustrates the manner in which 3-component normalize is performed in three instructions.

TABLE 3

```

# R1 = (nx,ny,nz)

# R0.xyz = normalize(R1)
# R0.w = 1/sqrt(nx*nx + ny*ny + nz*nz)

DP3 R0.w, R1, R1;
RSQ R0.w, R0.w;
MUL R0.xyz, R1, R0.w;
```

Table 4 illustrates the manner in which a 3-component cross product is performed in two instructions.

TABLE 4

```

# Cross product    | i    j    k    | into R2.
#                  | R0.x R0.y R0.z |
#                  | R1.x R1.y R1.z |

MUL R2, R0.zxyw, R1.yzxw;
MAD R2, R0.yzxw, R1.zxyw, −R2;
```

Table 5 illustrates the manner in which a 4-component vector absolute value is performed in one instruction.

TABLE 5

```

# Absolute value is the maximum of the negative and positive
# components of a vector.

# R1 = abs(R0)

MAX R1, R0, −R0;
```

Table 6 illustrates the manner in which the determinant of a 3×3 matrix is computed in three instructions.

TABLE 6

```

# Determinant of  | R0.x R0.y R0.z | into R3
#                 | R1.x R1.y R1.z |
#                 | R2.x R2.y R2.z |

MUL R3, R1.zxyw, R2.yzxw;
MAD R3, R1.yzxw, R2.zxyw, −R3;
DP3 R3, R0, R3;
```

Table 7 illustrates the manner in which a vertex position is transformed by a 4×4 matrix and then a homogeneous divide is performed.

TABLE 7

```

# c[20] = modelview row 0
# c[21] = modelview row 1
# c[22] = modelview row 2
# c[23] = modelview row 3

# result = R5

DP4 R5.w, v[OPOS], C[23];
DP4 R5.x, v[OPOS], C[20];
DP4 R5.y, v[OPOS], C[21];
DP4 R5.z, v[OPOS], C[22];
RCP R11, R5.w;
MUL R5,R5,R11;
```

Table 8 illustrates the manner a vector weighting of two vectors is performed using a single weight.

TABLE 8

```

# C[45] = (1.0, 1.0, 1.0, 1.0)

# R2 = vector 0
# R3 = vector 1
# v[WGHT].x = scalar weight to blend vectors 0 and 1
# result = R4 * v[WGHT].x + R4 * (1-v[WGHT])

ADD R11, -v[WGHT].x, c[45];    # compute (1-v[WGHT])
MUL R4, R3, R11;
MAD R4, v[WGHT].x, R3, R4
```

Table 9 illustrates the manner in which a value is reduced to some fundamental period such as 2*P1.

TABLE 9

```

# c[36] = (1.0/(2*PI), 2*PI, 0.0, 0.0)

# R1.x = input value
# R2 = result

MUL R0, R1, c[36].x;
EXP R4, R0.x;
MUL R2, R4.y, c[36].y;
```

Implementing a Simple Specular and Diffuse Lighting Computation with an Eye-space Normal One can perturb transformed vertex positions with a vertex program. A sequence of vertex program instructions can be used to refine the initial EXP approximation. The pseudo-macro below shows an example of how to refine the EXP approximation.

The psuedo-macro requires 10 instructions, 1 temp register, and 2 constant locations.

Simulation gives |max abs error|<3.77e−07 over the range (0.0<=x<1.0). Actual vertex program precision may be slightly less accurate than this.

A sequence of vertex program instructions can be used to refine the initial LOG approximation. The pseudo-macro in Table 10 shows an example of how to refine the LOG approximation.

The pseudo-macro requires 10 instructions, 1 temp register, and 3 constant locations.

TABLE 10

```
    CE0 = { 9.61597636e-03, -1.32823968e-03, 1.47491097e-04,
-1.08635004e-05 };
    CE1 = { 1.00000000e+00, -6.93147182e-01, 2.40226462e-01,
-5.55036440e-02 };
    /* Rt != Ro && Rt != Ri */
    EXP_MACRO(Ro:vector, Ri:scalar, Rt:vector) {
        EXP Rt, Ri.x;                /* Use appropriate component of Ri */
        MAD Rt.w, c[CE0].w, Rt.y, c[CE0].z;
        MAD Rt.w, Rt.w,Rt.y, c[CE0].y;
        MAD Rt.w, Rt.w,Rt.y, c[CE0].x;
        MAD Rt.w, Rt.w,Rt.y, c[CE1].w;
        MAD Rt.w, Rt.w,Rt.y, c[CE1].z;
        MAD Rt.w, Rt.w,Rt.y, c[CE1].y;
        MAD Rt.w, Rt.w,Rt.y, c[CE1].x;
        RCP Rt.w, Rt.w;
        MUL Ro, Rt.w, Rt.x;          /* Apply user write mask to Ro */
    }
```

Simulation gives max abs error|<1.79e−07 over the range (1.0<=x<2.0). Actual vertex program precision may be slightly less accurate than this.

Optional procedures and functions are shown in Table 10A.

TABLE 10A void BindProgramNV(enum target, uint id); void DeleteProgramsNV(sizei n, const uint *IDs); void ExecuteProgramNV(enum target, uint id, const float *params); void GenProgramsNV(sizei n, uint *IDs); boolean AreProgramsResidentNV(sizei n, const uint *IDs, boolean *residences); void RequestResidentProgramsNV(sizei n, uint *IDs);
void GetProgramParameterfvNV(enum target, uint index, enum pname, float *params); void GetProgramParameterdvNV(enum target, uint index, enum pname, double *params); void GetProgramivNV(uint id, enum pname, int *params); void GetProgramStringNV(uint id, enum pname, ubyte *Program); void GetTrackMatrixivNV(enum target, uint address, enum pname, int *params); void GetVertexAttribdvNV(uint index, enum pname, double *params); void GetVertexAttribfvNV(uint index, enum pname, float *params); void GetVertexAttribivNV(uint index, enum pname, int *params); void GetVertexAttribPointervNV(uint index, enum pname, void **pointer); boolean IsProgramNV(uint id); void LoadProgramNV(enum target, uint id, sizei len, const ubyte *Program);
void ProgramParameter4fNV(enum target, uint index, float x, float y, float z, float w) void ProgramParameter4dNV(enum target, uint index, double x, double y, double z, double w) void ProgramParameter4dvNV(enum target, uint index, const double *params); void ProgramParameter4fvNV(enum target, uint index, const float *params); void ProgramParameters4dvNV(enum target, uint index, uint num, const double *params); void ProgramParameters4fvNV(enum target, uint index, uint num, const float *params);
void TrackMatrixNV(enum target, uint address, enum matrix, enum transform);
void VertexAttribPointerNV(uint index, int size, enum type, sizei stride, const void *pointer);
void VertexAttrib1sNV(uint index, short x);
void VertexAttrib1fNV(uint index, float x);
void VertexAttrib1dNV(uint index, double x);
void VertexAttrib2sNV(uint index, short x, short y);
void VertexAttrib2fNV(uint index, float x, float y);
void VertexAttrib2dNV(uint index, double x, double y);
void VertexAttrib3sNV(uint index, short x, short y, short z);
void VertexAttrib3fNV(uint index, float x, float y, float z);
void VertexAttrib3dNV(uint index, double x, double y, double z);
void VertexAttrib4sNV(uint index, short x, short y, short z, short w);
void VertexAttrib4fNV(uint index, float x, float y, float z, float w);

TABLE 10A-continued void VertexAttrib4dNV(uint index, double x, double y, double z, double w);
void VertexAttrib4ubNV(uint index, ubyte x, ubyte y, ubyte z, ubyte w);
void VertexAttrib1svNV(uint index, const short *v);
void VertexAttrib1fvNV(uint index, const float *v);
void VertexAttrib1dvNV(uint index, const double *v);
void VertexAttrib2svNV(uint index, const short *v);
void VertexAttrib2fvNV(uint index, const float *v);
void VertexAttrib2dvNV(uint index, const double *v);
void VertexAttrib3svNV(uint index, const short *v);
void VertexAttrib3fvNV(uint index, const float *v);
void VertexAttrib3dvNV(uint index, const double *v);
void VertexAttrib4svNV(uint index, const short *v);
void VertexAttrib4fvNV(uint index, const float *v);
void VertexAttrib4dvNV(uint index, const double *v);
void VertexAttrib4ubvNV(uint index, const ubyte *v);
void VertexAttribs1svNV(uint index, sizei n, const short *v);
void VertexAttribs1fvNV(uint index, sizei n, const float *v);
void VertexAttribs1dvNV(uint index, sizei n, const double *v);
void VertexAttribs2svNV(uint index, sizei n, const short *v);
void VertexAttribs2fvNV(uint index, sizei n, const float *v);
void VertexAttribs2dvNV(uint index, sizei n, const double *v);
void VertexAttribs3svNV(uint index, sizei n, const short *v);
void VertexAttribs3fvNV(uint index, sizei n, const float *v);
void VertexAttribs3dvNV(uint index, sizei n, const double *v);
void VertexAttribs4svNV(uint index, sizei n, const short *v);
void VertexAttribs4fvNV(uint index, sizei n, const float *v);
void VertexAttribs4dvNV(uint index, sizei n, const double *v);
void VertexAttribs4ubvNV(uint index, sizei n, const ubyte *v);

Optional tokens are shown in Table 10B.

TABLE 10B

Accepted by the <cap> parameter of Disable, Enable, and IsEnabled, and by the <pname> parameter of GetBooleanv, GetIntegerv, GetFloatv, and GetDoublev, and by the <target> parameter of BindProgramNV, ExecuteProgramNV, GetProgramParameter[df]vNV, GetTrackMatrixivNV, LoadProgramNV, ProgramParameter[s] 4 [df] [v]NV, and TrackMatrixNV:

| | |
|---|---|
| VERTEX_PROGRAM_NV | 0x8620 |

Accepted by the <cap> parameter of Disable, Enable, and IsEnabled, and by the <pname> parameter of GetBooleanv, GetIntegerv, GetFloatv, and GetDoublev:

| | |
|---|---|
| VERTEX_PROGRAM_POINT_SIZE_NV | 0x8642 |
| VERTEX_PROGRAM_TWO_SIDE_NV | 0x8643 |

Accepted by the <target> parameter of ExecuteProgramNV and LoadProgramNV:

| | |
|---|---|
| VERTEX_STATE_PROGRAM_NV | 0x8621 |

Accepted by the <pname> parameter of GetVertexAttrib[dfi]vNV:

| | |
|---|---|
| ATTRIB_ARRAY_SIZE_NV | 0x8623 |
| ATTRIB_ARRAY_STRIDE_NV | 0x8624 |
| ATTRIB_ARRAY_TYPE_NV | 0x8625 |
| CURRENT_ATTRIB_NV | 0x8626 |

Accepted by the <pname> parameter of GetProgramParameterfvNV and GetProgramParameterdvNV:

| | |
|---|---|
| PROGRAM_PARAMETER_NV | 0x8644 |

Accepted by the <pname> parameter of GetVertexAttribPointervNV:

| | |
|---|---|
| ATTRIB_ARRAY_POINTER_NV | 0x8645 |

Accepted by the <pname> parameter of GetProgramivNV:

| | |
|---|---|
| PROGRAM_TARGET_NV | 0x8646 |
| PROGRAM_LENGTH_NV | 0x8627 |
| PROGRAM_RESIDENT_NV | 0x8647 |

Accepted by the <pname> parameter of GetProgramStringNV:

| | |
|---|---|
| PROGRAM_STRING_NV | 0x8628 |

Accepted by the <pname> parameter of GetTrackMatrixivNV:

| | |
|---|---|
| TRACK_MATRIX_NV | 0x8648 |
| TRACK_MATRIX_TRANSFORM_NV | 0x8649 |

TABLE 10B-continued

Accepted by the <pname> parameter of GetBooleanv, GetIntegerv, GetFloatv, and GetDoublev:

| | |
|---|---|
| MAX_TRACK_MATRIX_STACK_DEPTH_NV | 0x862E |
| MAX_TRACK_MATRICES_NV | 0x862F |
| CURRENT_MATRIX_STACK_DEPTH_NV | 0x8640 |
| CURRENT_MATRIX_NV | 0x8641 |
| VERTEX_PROGRAM_BINDING_NV | 0x864A |
| PROGRAM_ERROR_POSITION_NV | 0x864B |

Accepted by the <matrix> parameter of TrackMatrixNV:

NONE
MODELVIEW
PROJECTION
TEXTURE
COLOR (if ARB_imaging is supported)

| | |
|---|---|
| MODELVIEW_PROJECTION_NV | 0x8629 |

Accepted by the <matrix> parameter of TrackMatrixNV and by the <mode> parameter of MatrixMode:

| | |
|---|---|
| MATRIX0_NV | 0x8630 |
| MATRIX1_NV | 0x8631 |
| MATRIX2_NV | 0x8632 |
| MATRIX3_NV | 0x8633 |
| MATRIX4_NV | 0x8634 |
| MATRIX5_NV | 0x8635 |
| MATRIX6_NV | 0x8636 |
| MATRIX7_NV | 0x8637 |

(Enumerates 0x8638 through 0x863F are reserved for further matrix enumerates 8 through 15.)
Accepted by the <transform> parameter of TrackMatrixNV:

| | |
|---|---|
| IDENTITY_NV | 0x862A |
| INVERSE_NV | 0XB62B |
| TRANSPOSE_NV | 0XB62C |
| INVERSE_TRANSPOSE_NV | 0x862D |

Accepted by the <array> parameter of EnableClientState and DisableClientState, by the <cap> parameter of IsEnabed and by the <pname> parameter of GetBooleanv, GetIntegerv, GetFloatv, and GetDoublev:

| | |
|---|---|
| VERTEX_ATTRIB_ARRAY0_NV | 0x8650 |
| VERTEX_ATTRIB_ARRAY1_NV | 0x8651 |
| VERTEX_ATTRIB_ARRAY2_NV | 0x8652 |
| VERTEX_ATTRIB_ARRAY3_NV | 0x8653 |
| VERTEX_ATTRIB_ARRAY4_NV | 0x8654 |
| VERTEX_ATTRIB_ARRAY5_NV | 0x8655 |
| VERTEX_ATTRIB_ARRAY6_NV | 0x8656 |
| VERTEX_ATTRIB_ARRAY7_NV | 0x8657 |
| VERTEX_ATTRIB_ARRAY8_NV | 0x8658 |
| VERTEX_ATTRIB_ARRAY9_NV | 0x8659 |
| VERTEX_ATTRIB_ARRAY10_NV | 0x865A |
| VERTEX_ATTRIB_ARRAY11_NV | 0x865B |
| VERTEX_ATTRIB_ARRAY12_NV | 0x865C |
| VERTEX_ATTRIB_ARRAY13_NV | 0x865D |
| VERTEX_ATTRIB_ARRAY14_NV | 0x865E |
| VERTEX_ATTRIB_ARRAY15_NV | 0x865F |

Accepted by the <target> parameter of GetMapdv, GetMapfv, GetMapiv, Map1d and Map1f and by the <cap> parameter of Enable, Disable, and IsEnabled, and by the <pname> parameter of GetBooleanv, GetIntegerv, GetFloatv, and GetDoublev:

| | |
|---|---|
| MAP1_VERTEX_ATTRIB0_4_NV | 0x8660 |
| MAP1_VERTEX_ATTRIB1_4_NV | 0x8661 |
| MAP1_VERTEX_ATTRIB2_4_NV | 0x8662 |
| MAP1_VERTEX_ATTRIB3_4_NV | 0x8663 |
| MAP1_VERTEX_ATTRIB4_4_NV | 0x8664 |
| MAP1_VERTEX_ATTRIB5_4_NV | 0x8665 |
| MAP1_VERTEX_ATTRIB6_4_NV | 0x8666 |
| MAP1_VERTEX_ATTRIB7_4_NV | 0x8667 |
| MAP1_VERTEX_ATTRIB8_4_NV | 0x8668 |
| MAP1_VERTEX_ATTRIB9_4_NV | 0x8669 |
| MAP1_VERTEX_ATTRIB10_4_NV | 0x866A |
| MAP1_VERTEX_ATTRIB11_4_NV | 0x866B |
| MAP1_VERTEX_ATTRIB12_4_NV | 0x866C |
| MAP1_VERTEX_ATTRIB13_4_NV | 0x866D |
| MAP1_VERTEX_ATTRIB14_4_NV | 0x866E |
| MAP1_VERTEX_ATTRIB15_4_NV | 0x866F |

TABLE 10B-continued

Accepted by the <target> parameter of GetNapdv, GetMapfv, GetMapiv, Map2d and Map2f and by the <cap> parameter of Enable, Disable, and IsEnabled, and by the <pname> parameter of GetBooleanv, GetIntegerv, GetFloatv, and GetDoublev:

| | |
|---|---|
| MAP2_VERTEX_ATTRIB0_4_NV | 0x8670 |
| MAP2_VERTEX_ATTRIB1_4_NV | 0x8671 |
| MAP2_VERTEX_ATTRIB2_4_NV | 0x8672 |
| MAP2_VERTEX_ATTRIB3_4_NV | 0x8673 |
| MAP2_VERTEX_ATTRIB4_4_NV | 0x8674 |
| MAP2_VERTEX_ATTRIB5_4_NV | 0x8675 |
| MAP2_VERTEX_ATTRIB6_4_NV | 0x8676 |
| MAP2_VERTEX_ATTRIB7_4_NV | 0x8677 |
| MAP2_VERTEX_ATTRIB8_4_NV | 0x8678 |
| MAP2_VERTEX_ATTRIB9_4_NV | 0x8679 |
| MAP2_VERTEX_ATTRIB10_4_NV | 0x867A |
| MAP2_VERTEX_ATTRIB11_4_NV | 0x867B |
| MAP2_VERTEX_ATTRIB12_4_NV | 0x867C |
| MAP2_VERTEX_ATTRIB13_4_NV | 0x867D |
| MAP2_VERTEX_ATTRIB14_4_NV | 0x867E |
| MAP2_VERTEX_ATTRIB15_4_NV | 0x867F |

Software Considerations

It should be noted that software can be used to implement, extend, optimize, and otherwise support the foregoing vertex program architecture in several ways. Examples of such optional techniques will now be set forth.

Analyze and Optimize User Programs

User-supplied programs are often less than optimally written for performance and size. Software can be used to analyze the structure of the instructions in a program and use such analysis information to transform the program into an output-equivalent, more efficient program. Equivalent, in the context of the present description, means that the computed output is indistinguishable from what the original program computes. The phrase "more efficient" means that the program either executes in less time, requires less instruction space storage on the hardware, or both.

In the context of the present description, there are two general kinds of optimizations, namely hardware-independent and hardware-dependent optimizations. Hardware-independent optimizations apply to a program independent of the actual hardware on which it executes. Hardware-dependent optimizations are specific to a particular hardware implementation and may be ineffective, less efficient or even incorrect if used for different hardware.

Hardware-Independent Optimizations

One optimization involves the removal of "dead" instructions. Standard compiler optimization techniques can be used to determine which computational results can ever influence each final output value of a program. More information on such feature may be found with reference to "Compilers, Principles and Techniques," Aho, Sethi, and Ullman, Addison Wesley, 1986 ISBN 0-201-10088-6, which is incorporated herein by reference.

If it is not possible for a particular computation to influence any output value, the value of that computation is said to be "dead". If all of the output values computed by an instruction are dead, the instruction is considered dead as well and can be removed from the program without altering the outcome. This optimizes the program by making it both smaller and potentially faster. Removal of the dead output values, instructions, etc. of a computation can also indirectly optimize programs since it may allow further optimizations to become possible.

Another optimization involves combining unrelated operations. A single program instruction can produce up to four independent results. For example, a MUL (multiply) instruction may compute four (4) independent multiplies of four (4) different pairs of values. If a user program is not using all four (4) computations, it is sometimes possible to rearrange the order of instructions and combine two (2) or more user-specified MUL instructions so that all of the specified computations are done using fewer instructions.

Hardware-Dependent Optimizations

One example of hardware-dependent optimizations includes dual and tri-issue of instructions. A particular hardware implementation may be able to compute the result of two or more different instructions simultaneously. For example, a hardware implementation may be able to execute the following three instructions of Table 10C at the same time using a single micro-code instruction.

TABLE 10C

DP4 o[HPOS].w,R2,c[12] ;
DP4 R0.x,R2,c[12] ;
RSQ R1,v[3] ;

Yet another example of hardware-dependent optimizations involves reordering instructions to avoid stalls. A particular hardware implementation may have timing latencies where the result of an instruction will not immediately be available for use as input to a subsequent instruction. In such case, software can be used to reorder instructions so that another, non-dependent instruction can be executed in such time slot, thus improving the throughput of the program.

Still yet another example of hardware-dependent optimizations includes renumbering registers (i.e. "register coloring"). The particular register numbers specified in a user program may prevent certain hardware specific optimizations. Using different, but computationally equivalent registers may allow these optimizations. For example, the following two (2) instructions of Table 10D cannot be combined on a hardware implementation, while the two (2) instructions of Table 10E may.

TABLE 10D

MUL R4,c[32],v[3] ;
RCP R2,R2 ;

TABLE 10E

MUL R4,c[32],v[3] ;
RCP R1,R1 ;

If all of the references to register R2 in Table 10D were replaced with R1 (and all the references to R1 were replaced with R2), the program may compute the same result. Further, the program may be optimized to both take less micro-code instruction space and to execute in less time.

CPU Assistance in Program Execution

Software emulation may be used as an aid in optimizing hardware program performance in many ways. For instance, the central processing unit (CPU) may analyze actual input data prior to sending it to the hardware to help reduce the amount of data that the hardware must process. Further, the CPU may also split the workload, doing part of the computation with the hardware doing the remainder.

Culling

There are several reasons that a particular primitive (triangle) sent to the hardware may not draw anything. One common reason is that it is "backfacing" (the back side is facing the viewer) and the application has instructed the computer to not draw any such triangles on the screen. The CPU can emulate the operation of a vertex program, compute which way each triangle is facing, and only send data for the front facing triangles to the hardware. This can save time. Less data is sent to the hardware, and the hardware doesn't spend time doing computations for triangles that will never be drawn.

To further optimize this process, the CPU may analyze a program with a variation of dead instruction removal and determine which instructions directly compute a position. Then, the CPU may strip out all unnecessary instructions and emulate just the minimal computation required to compute position.

Co-Execution

A program can be split into two (2) parts with the CPU emulating some of the computations, and the hardware executing the remainder.

Software Emulation

A fill software emulation may be done by the CPU. This can be accomplished either by a general interpretation of the user program, or by compiling the program into native CPU dependent instructions.

General Interpretation

A C-program can emulate the operation of the hardware by interpreting the original input string of the user, or some intermediate representation thereof.

Native Code Emulation

Binary native CPU machine language instructions can be generated that emulate the operation of a particular program on the target hardware. When given the correct input data and executed by the CPU, such instructions may compute a value equivalent to what the hardware would compute. Table 10F illustrates an instruction and an Intel® x86 instruction sequence by which the initial instruction may be implemented.

TABLE 10F

```
DP3 R0,-c[4],v[0]
    fld c[4].x
    fneg
    fmul v[0].x
    fld c[4].y
    fneg
    fmul v[0].y
    fld c[4].z
    fneg
    fmul v[0].z
    fadd
    fadd
    fst r0.x
    fst r0.y
    fst r0.z
    fstp r0.w
```

It should be noted that many more optimal x86 instruction sequences can be used as well.

Dead Code Elimination

Removal of dead computations improves software emulation. Table 10G illustrates two (2) exemplary instructions.

TABLE 10G

```
ADD R0,R1,R2
MUL o[3].xyz,c[0],R0.x
```

The first ADD instruction specifies that all four (4) components (i.e. x, y, z, and w) be added, while the second instruction only uses the x component of the resulting sum as input. Assuming no later instructions use the y, z, or w components, such components are dead and there is no need to compute them. A hardware performance penalty may be avoided by there being four (4) dedicated adders working in parallel so there is no reason to alter the instruction. For a CPU emulator, however, the penalty can be severe. As such, removing dead component values from instructions affords a large advantage.

Software Extension of Architecture

Partial or complete CPU emulation can be used to add new functionality in a framework. For example, an abstract machine design could be extended to include sine and cosine functions that are not directly supported by hardware. Programs that use these instructions may be emulated in software either partially and/or completely.

Software Supported Workaround for Bugs in Hardware

CPU emulation can be used to work around flaws in a particular hardware. implementation. Values that would be incorrectly computed by hardware could be computed by the CPU instead and transferred to the hardware for the remainder of the processing.

Partial Software Implementation for Use with Partial Hardware Target

A low-cost or low-power hardware implementation might not include some components required by a full implementation. The CPU could perform the needed computations and transfer the results to the hardware to complete the computation.

APPENDIX A

The following thirty-five rendering commands are sent to the sever as part of a glXRender request:

APPENDIX A

The following thirty-five rendering commands are sent to the sever as part of a glxRender request:

| | | | |
|---|---|---|---|
| BindProgramNV | | | |
| 2 | 12 | | rendering command length |
| 2 | .... | | rendering command opcode |
| | 4 | ENUM | target |
| | 4 | CARD32 | id |
| ExecuteProgramNV | | | |
| 2 | 12+4*n | | rendering command length |
| 2 | .... | | rendering command opcode |
| | 4 | ENUM | target |
| | 0x8621 n=4 | | GL_VERTEX_STATE_ PROGRAM_NV |
| | else n=0 | | command is erroneous |
| | 4 | CARD32 | id |
| | 4*n | LISTofFLOAT32 | params |
| RequestResidentProgramsNV | | | |
| 2 | 8+4*n | | rendering command length |
| 2 | .... | | rendering command opcode |
| | 4 | INT32 | n |
| | n*4 | CARD32 | programs |
| LoadProgramNV | | | |
| 2 | 16+n+p | | rendering command length |
| 2 | .... | | rendering command opcode |
| | 4 | ENUM | target |
| | 4 | CARD32 | id |
| | 4 | INT32 | len |
| | n | LISTofCARD8 | n |
| | p | | unused, p=pad(n) |
| ProgramParameter4fvNV | | | |
| 2 | 32 | | rendering command length |
| 2 | .... | | rendering command opcode |
| | 4 | ENUM | target |
| | 4 | CARD32 | index |
| | 4 | FLOAT32 | params[0] |
| | 4 | FLOAT32 | params[1] |
| | 4 | FLOAT32 | params[2] |
| | 4 | FLOAT32 | params[3] |

APPENDIX A-continued

The following thirty-five rendering commands are sent to the sever as part of a glxRender request:

```
ProgramParameter4dvNV
   2      44                rendering command length
   2      . . . .           rendering command opcode
   4      ENUM              target
   4      CARD32            index
   8      FLOAT64           params[0]
   8      FLOAT64           params[1]
   8      FLOAT64           params[2]
   8      FLOAT64           params[3]
ProgramParameters4fvNV
   2      16+16*n           rendering command length
   2      . . . .           rendering command opcode
   4      ENUM              target
   4      CARD32            index
   4      CARD32            n
   16*n   FLOAT32           params
ProgramParameters4dvNV
   2      16+32*n           rendering command length
   2      . . . .           rendering command opcode
   4      ENUM              target
   4      CARD32            index
   4      CARD32            n
   32*n   FLOAT64           params
TrackMatrixNV
   2      20                rendering command length
   2      . . . .           rendering command opcode
   4      ENUM              target
   4      CARD32            address
   4      ENUM              matrix
   4      ENUM              transform
VertexAttribPointerNV is an entirely client-side command
VertexAttrib1svNV
   2      12                rendering command length
   2      . . . .           rendering command opcode
   4      CARD32            index
   2      INT16             v[0]
   2                        unused
VertexAttrib2svNV
   2      12                rendering command length
   2      . . . .           rendering command opcode
   4      CARD32            index
   2      INT16             v[0]
   2      INT16             v[1]
VertexAttrib3svNV
   2      12                rendering command length
   2      . . . .           rendering command opcode
   4      CARD32            index
   2      INT16             v[0]
   2      INT16             v[1]
   2      INT16             v[2]
   2                        unused
VertexAttrib4svNV
   2      12                rendering command length
   2      . . . .           rendering command opcode
   4      CARD32            index
   2      INT16             v[0]
   2      INT16             v[1]
   2      INT16             v[2]
   2      INT16             v[3]
VertexAttrib1fvNV
   2      12                rendering command length
   2      . . . .           rendering command opcode
   4      CARD32            index
   4      FLOAT32           v[0]
VertexAttrib2fvNV
   2      16                rendering command length
   2      . . . .           rendering command opcode
   4      CARD32            index
   4      FLOAT32           v[0]
   4      FLOAT32           v[1]
VertexAttrib3fvNV
   2      20                rendering command length
   2      . . . .           rendering command opcode
   4      CARD32            index
   4      FLOAT32           v[0]
   4      FLOAT32           v[1]
```

APPENDIX A-continued

The following thirty-five rendering commands are sent to the sever as part of a glxRender request:

```
   4      FLOAT32           v[2]
VertexAttrib4fvNV
   2      24                rendering command length
   2      . . . .           rendering command opcode
   4      CARD32            index
   4      FLOAT32           v[0]
   4      FLOAT32           v[1]
   4      FLOAT32           v[2]
   4      FLOAT32           v[3]
VertexAttrib1dvNV
   2      16                rendering command length
   2      . . . .           rendering command opcode
   4      CARD32            index
   8      FLOAT64           v[0]
VertexAttrib2dvNV
   2      24                rendering command length
   2      . . . .           rendering command opcode
   4      CARD32            index
   8      FLOAT64           v[0]
   8      FLOAT64           v[1]
VertexAttrib3dvNV
   2      32                rendering command length
   2      . . . .           rendering command opcode
   4      CARD32            index
   8      FLOAT64           v[0]
   8      FLOAT64           v[1]
   8      FLOAT64           v[2]
VertexAttrib4dvNV
   2      40                rendering command length
   2      . . . .           rendering command opcode
   4      CARD32            index
   8      FLOAT64           v[0]
   8      FLOAT64           v[1]
   8      FLOAT64           v[2]
   8      FLOAT64           v[3]
VertexAttrib4ubvNV
   2      12                rendering command length
   2      . . . .           rendering command opcode
   4      CARD32            index
   1      CARD8             v[0]
   1      CARD8             v[1]
   1      CARD8             v[2]
   1      CARD8             v[3]
VertexAttribs1svNV
   2      12+2*n+p          rendering command length
   2      . . . .           rendering command opcode
   4      CARD32            index
   4      CARD32            n
   2*n    INT16             v
   p                        unused, p=pad(2*n)
VertexAttribs2svNV
   2      12+4*n            rendering command length
   2      . . . .           rendering command opcode
   4      CARD32            index
   4      CARD32            n
   4*n    INT16             v
VertexAttribs3svNV
   2      12+6*n+p          rendering command length
   2      . . . .           rendering command opcode
   4      CARD32            index
   4      CARD32            n
   6*n    INT16             v
   p                        unused, p=pad(6*n)
VertexAttribs4svNV
   2      12+8*n            rendering command length
   2      . . . .           rendering command opcode
   4      CARD32            index
   4      CARD32            n
   8*n    INT16             v
VertexAttribs1fvNV
   2      12+4*n            rendering command length
   2      . . . .           rendering command opcode
   4      CARD32            index
   4      CARD32            n
   4*n    FLOAT32           v
```

APPENDIX A-continued

The following thirty-five rendering commands are sent to the sever as part of a glxRender request:

```
VertexAttribs2fvNV
    2       12+8*n      rendering command length
    2       ....        rendering command opcode
    4       CARD32      index
    4       CARD32      n
    6*n     FLOAT32     v
VertexAttribs3fvNV
    2       12+12*n     rendering command length
    2       ....        rendering command opcode
    4       CARD32      index
    4       CARD32      n
    12*n    FLOAT32     v
VertexAttribs4fvNV
    2       12+16*n     rendering command length
    2       ....        rendering command opcode
    4       CARD32      index
    4       CARD32      n
    16*n    FLOAT32     v
VertexAttribs1dvNV
    2       12+8*n      rendering command length
    2       ....        rendering command opcode
    4       CARD32      index
    4       CARD32      n
    8*n     FLOAT64     v
VertexAttribs2dvNV
    2       12+16*n     rendering command length
    2       ....        rendering command opcode
    4       CARD32      index
    4       CARD32      n
    16*n    FLOAT64     v
VertexAttribs3dvNV
    2       12+24*n     rendering command length
    2       ....        rendering command opcode
    4       CARD32      index
    4       CARD32      n
    24*n    FLOAT64     v
VertexAttribs4dvNV
    2       12+32*n     rendering command length
    2       ....        rendering command opcode
    4       CARD32      index
    4       CARD32      n
    32*n    FLOAT64     v
VertexAttribs4ubvNV
    2       12+4*n      rendering command length
    2       ....        rendering command opcode
    4       CARD32      index
    4       CARD32      n
    4*n     CARD8       v
```

The remaining twelve commands are non-rendering commands. These commands are sent separately (i.e., not as part of a glXRender or glXRenderLarge request), using the glXVendorPrivateWithReply request:

```
AreProgramsResidentNV
    1       CARD8       opcode (X assigned)
    1       17          GLX opcode
(glXVendorPrivateWithReply)
    2       4+n         request length
    4       ....        vendor specific opcode
    4       GLX_        context tag
            CONTEXT_
            TAG
    4       INT32       n
    n*4     LISTofCARD32 programs
    =>
    1       1           reply
    1                   unused
    2       CARD16      sequence number
    4       (n+p)/4     reply length
    4       BOOL32      return value
    20                  unused
    n       LISTofBOOL  programs
    p                   unused, ppad(n)
DeleteProgramsNV
    1       CARD8       opcode (X assigned)
    1       17          GLX opcode
(glXVendorPrivateWithReply)
    2       4+n         request length
    4       ....        vendor specific opcode
    4       GLX_        context tag
            CONTEXT_
            TAG
    4       INT32       n
    n*4     LISTofCARD32 programs
GenProgramsNV
    1       CARD8       opcode (X assigned)
    1       17          GLX opcode
(glXVendorPrivateWithReply)
    2       4           request length
    4       ....        vendor specific opcode
    4       GLX_        context tag
            CONTEXT_
            TAG
    4       INT32       n
    =>
    1       1           reply
    1                   unused
    2       CARD16      sequence number
    4       n           reply length
    24                  unused
    n*4     LISTofCARD322 programs
GetProgramParameterfvNV
    1       CARD8       opcode (X assigned)
    1       17          GLX opcode
(glXVendorPrivateWithReply)
    2       6           request length
    4       ....        vendor specific opcode
    4       GLX_        context tag
            CONTEXT_
            TAG
    4       ENUM        target
    4       CARD32      index
    4       ENUM        pname
    =>
    1       1           reply
    1                   unused
    2       CARD16      sequence number
    4       m           reply length, m=(n==1.0:n)
    4                   unused
    4       CARD32      n
    if (n=1) this follows:
        4       FLOAT32     params
        12                  unused
    otherwise this follows:
        16                  unused
        n*4     LISTofFLOAT32 params
GetProgramParameterdvNV
    1       CARD8       opcode (X assigned)
    1       17          GLX opcode
(glXVendorPrivateWithReply)
    2       6           request length
    4       ....        vendor specific opcode
    4       GLX_        context tag
            CONTEXT_
            TAG
    4       ENUM        target
    4       CARD32      index
    4       ENUM        pname
    =>
    1       1           reply
    1                   unused
    2       CARD16      sequence number
    4       m           reply length, m=(n==1.0:n*2)
    4                   unused
    4       CARD32      n
    if (n=1) this follows:
        8       FLOAT64     params
        8                   unused
```

-continued

```
        otherwise this follows:
            16                      unused
            n*8     LISTofFLOAT64   params
GetProgramivNV
            1       CARD8           opcode (X assigned)
            1       17              GLX opcode
        (glXVendorPrivateWithReply)
            2       5               request length
            4       ....            vendor specific opcode
            4       GLX_            context tag
                    CONTEXT_
                    TAG
            4       CARD32          id
            4       ENUM            pname
        =>
            1       1               reply
            1                       unused
            2       CARD16          sequence number
            4       m               reply length, m=(n==1.0:n)
            4                       unused
            4       CARD32          n
        if (n=1) this follows:
            4       INT32           params
            12                      unused
        otherwise this follows:
            16                      unused
            n*4     LISTofINT32     params
GetProgramStringNV
            1       CARD8           opcode (X assigned)
            1       17              GLX opcode
        (glXVendorPrivateWithReply)
            2       5               request length
            4       ....            vendor specific opcode
            4       GLX_            context tag
                    CONTEXT_
                    TAG
            4       CARD32          id
            4       ENUM            pname
        =>
            1       1               reply
            1                       unused
            2       CARD16          sequence number
            4       (n+p)/4         reply length
            4                       unused
            4       CARD32          n
            16                      unused
            n       STRING          program
            p                       unused, p=pad(n)
GetTrackMatrixivNV
            1       CARD8           opcode (X assigned)
            1       17              GLX opcode
        (glXVendorPrivateWithReply)
            2       6               request length
            4       ....            vendor specific opcode
            4       GLX_            context tag
                    CONTEXT_
                    TAG
            4       ENUM            target
            4       CARD32          address
            4       ENUM            pname
        =>
            1       1               reply
            1                       unused
            2       CARD16          sequence number
            4       m               reply length, m=(n==1.0:n)
            4                       unused
            4       CARD32          n
        if (n=1) this follows:
            4       INT32           params
            12                      unused
        otherwise this follows:
            16                      unused
            n*4     LISTofINT32     params
```

Note that ATTRIB_ARRAY_SIZE_NV, ATTRIB_ARRAY_STRIDE_NV, and ATTRIB_ARRAY_TYPE_NV may be queried by GetVertexAttribNV but return client-side state.

```
GetVertexAttribdvNV
            1       CARD8           opcode (X assigned)
            1       17              GLX opcode
        (glXVendorPrivateWithReply)
            2       5               request length
            4       ....            vendor specific opcode
            4       GLX_            context tag
                    CONTEXT_
                    TAG
            4       INT32           index
            4       ENUM            pname
        =>
            1       1               reply
            1                       unused
            2       CARD16          sequence number
            4       m               reply length, m=(n==1.0:n*2)
            4                       unused
            4       CARD32          n
        if (n=1) this follows:
            8       FLOAT64         params
        otherwise this follows:
            16                      unused
            n*8     LISTofFLOAT64   params
GetVertexAttribfvNV
            1       CARD8           opcode (X assigned)
            1       17              GLX opcode
        (glXVendorPrivateWithReply)
            2       5               request length
            4       ....            vendor specific opcode
            4       GLX_            context tag
                    CONTEXT_
                    TAG
            4       INT32           index
            4       ENUM            pname
        =>
            1       1               reply
            1                       unused
            2       CARD16          sequence number
            4       m               reply length, m=(n==1.0:n)
            4                       unused
            4       CARD32          n
        if (n=1) this follows:
            4       FLOAT32         params
            12                      unused
        otherwise this follows:
            16                      unused
            n*4     LISTofFLOAT32   params
GetVertexAttribivNV
            1       CARD8           opcode (X assigned)
            1       17              GLX opcode
        (glXVendorPrivateWithReply)
            2       5               request length
            4       ....            vendor specific opcode
            4       GLX_            context tag
                    CONTEXT_
                    TAG
            4       INT32           index
            4       ENUM            pname
        =>
            1       1               reply
            1                       unused
            2       CARD16          sequence number
            4       m               reply length, m=(n==1.0:n)
            4                       unused
            4       CARD32          n
        if (n=1) this follows:
            4       INT32           params
            12                      unused
        otherwise this follows:
            16                      unused
            n*4     LISTofINT32     params
GetVertexAttribPointerNV is an entirely client-side command
    IsProgramNV
            1       CARD8           opcode (X assigned)
            1       17              GLX opcode
        (glXVendorPrivateWithReply)
            2       4               request length
            4       ....            vendor specific opcode
            4       GLX_            context tag
```

-continued

|   | CONTEXT_TAG |   |
|---|---|---|
| 4 | INT32 | n |
| => |   |   |
| 1 | 1 | reply |
| 1 |   | unused |
| 2 | CARD16 | sequence number |
| 4 | 0 | reply length |
| 4 | BOOL32 | return value |
| 20 |   | unused |

APPENDIX B

Errors

The error INVALID_VALUE is generated if VertexAttribNV is called where index is greater than 15.
The error INVALID_VALUE is generated if any ProgramParameterNV has an index is greater than 95.
The error INVALID_VALUE is generated if VertexAttribPointerNV is called where index is greater than 15. The error INVALID_VALUE is generated if VertexAttribPointerNV is called where size is not one of 1, 2, 3, or 4.
The error INVALID_VALUE is generated if VertexAttribPointerNV is called where Stride is negative.
The error INVALID_OPERATION is generated if VertexAttribPointerNV is called where type is UNSIGNED_BYTE and size is not 4.
The error INVALID_VALUE is generated if LoadProgramNV is used to load a program with an ID of zero.
The error INVALID_OPERATION is generated if LoadProgramNV is used to load an ID that is currently loaded with a program of a different program target.
The error INVALID_OPERATION is generated if the program passed to LoadProgramNV fails to load because it is not syntactically correct based on the specified target. The value of PROGRAM_ERROR_POSITION_NV is still updated when this error is generated.
The error INVALID_OPERATION is generated if LoadProgramNV has a target of VERTEX_PROGRAM_NV and the specified program fails to load because it does not write the HPOS register at least once. The value of PROGRAM_ERROR_POSITION_NV is still updated when this error is generated.
The error INVALID_OPERATION is generated if LoadProgramNV has a target of VERTEX_STATE_PROGRAM_NV and the specified program fails to load because it does not write at least one program parameter register. The value of PROGRAM_ERROR_POSITION_NV is still updated when this error is generated.
The error INVALID_OPERATION is generated if the vertex program or vertex state program passed to LoadProgramNV fails to load because it contains more than 129 instructions. The value of PROGRAM_ERROR_POSITION_NV is still updated when this error is generated.
The error INVALID_OPERATION is generated if a program is loaded with LoadProgramNV for ID when ID is currently loaded with a program of a different target.
The error INVALID_OPERATION is generated if BindProgramNV attempts to bind to a program name that is not a vertex program (for example, if the program is a vertex state program).
The error INVALID_VALUE is generated if GenProgramsNV is called where n is negative.
The error INVALID_VALUE is generated if AreProgramsResidentNV is called and any of the queried programs are zero or do not exist.
The error INVALID_OPERATION is generated if ExecuteProgramNV executes a program that does not exist.
The error INVALID_OPERATION is generated if ExecuteProgramNV executes a program that is not a vertex state program.
The error INVALID_OPERATION is generated if Begin, RasterPos, or a command that performs an explicit Begin is called when vertex program mode is enabled and the currently bound vertex program writes program parameters that are currently being tracked.
The error INVALID_OPERATION is generated if ExecuteProgramNV is called and the vertex state program to execute writes program parameters that are currently being tracked.
The error INVALID_VALUE is generated if TrackMatrixNV has a target of VERTEX_PROGRAM_NV and attempts to track an address is not a multiple of four.

APPENDIX B-continued

Errors

The error INVALID_VALUE is generated if GetProgramParameterNV is called to query an index greater than 95.
The error INVALID_VALUE is generated if GetVertexAttribNV is called to query an index greater than 15 or equal to zero.
The error INVALID_VALUE is generated if GetVertexAttribPointerNV is called to query an index greater than 15.
The error INVALID_OPERATION is generated if GetProgramivNV is called and the program named ID does not exist.
The error INVALID_OPERATION is generated if GetProgramStringNV is called and the program named ID does not exist.
The error INVALID_VALUE error is generated if GetTrackMatrixivNV is called with an address that is not divisible by four and not less than 96.

While various embodiments have been described above, it may be understood that they have been presented by way of example only, and not limitation. Thus, the breadth and scope of a preferred embodiment may not be limited by any of the above described exemplary embodiments, but may be defined only in accordance with the following claims and their equivalents.

What is claimed is:

1. A method for generating graphics by aliasing vertex attributes during vertex processing, the method comprising:

associating an identifier defined by an application-programmable vertex processing system with a parameter defined according to conventional vertex processing;

calling the identifier defined by the application-programmable vertex processing system;

determining which parameter defined according to conventional vertex processing is associated with the called identifier;

retrieving the parameter determined to be associated with the called identifier; and generating a graphic using the retrieved parameter.

2. The method of claim 1, wherein the parameter defined according to conventional vertex processing comprises an OpenGL defined parameter.

3. The method of claim 1, wherein the parameter defined according to conventional vertex processing comprises a D3D defined parameter.

4. The method of claim 1, further comprising:

retrieving a second parameter defined according to conventional vertex processing by calling the convention-defined vertex parameter.

5. The method of claim 1, wherein the identifier defined by an application-programmable vertex processing system corresponds to a vertex attribute register.

6. A system for generating graphics by aliasing vertex attributes during vertex processing, the method comprising:

a memory device;

a plurality of instructions stored on the memory device, the plurality of instructions configured to:

associate an identifier defined by an application-programmable vertex processing system with a parameter defined according to conventional vertex processing;

call the identifier defined by the application-programmable vertex processing system;

determine which parameter defined according to conventional vertex processing is associated with the called identifier;

retrieve the parameter determined to be associated with the called identifier; and generate a graphic using the retrieved parameter.

7. A system for generating graphics by aliasing vertex attributes during vertex processing, the method comprising:

means for associating an identifier defined by an application-programmable vertex processing system with a parameter defined according to conventional vertex processing;

means for calling the identifier defined by the application-programmable vertex processing system;

means for determining which parameter defined according to conventional vertex processing is associated with the called identifier;

means for retrieving the parameter determined to be associated with the called identifier; and generating a graphic using the retrieved parameter.

* * * * *